(12) United States Patent
Morgan et al.

(10) Patent No.: US 11,245,882 B2
(45) Date of Patent: Feb. 8, 2022

(54) IMAGE SLICING TO GENERATE INPUT FRAMES FOR A DIGITAL MICROMIRROR DEVICE

(71) Applicant: Texas Instruments Incorporated, Dallas, TX (US)

(72) Inventors: Daniel Jay Morgan, McKinney, TX (US); Aravind Lakshminarayanan, Plano, TX (US); Vivek Kumar Thakur, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/596,292

(22) Filed: Oct. 8, 2019

(65) Prior Publication Data

US 2020/0112708 A1    Apr. 9, 2020

Related U.S. Application Data

(60) Provisional application No. 62/742,558, filed on Oct. 8, 2018.

(51) Int. Cl.
H04N 9/31    (2006.01)

(52) U.S. Cl.
CPC ......... H04N 9/3179 (2013.01); H04N 9/3108 (2013.01)

(58) Field of Classification Search
CPC ........ H04N 9/31; H04N 9/3179; H04N 9/312; H04N 9/3141; H04N 9/3108

USPC ....... 348/739, 744, 759, 762, 764, 767, 770, 348/771, 659, 239, 465, 578, 598, 705, 348/706; 382/171, 173; 345/204
See application file for complete search history.

(56) References Cited

U.S. PATENT DOCUMENTS

| | | | |
|---|---|---|---|
| 2008/0024683 A1* | 1/2008 | Damera-Venkata | H04N 9/3185 348/744 |
| 2010/0253849 A1* | 10/2010 | Kegasawa | G09G 3/3648 348/584 |
| 2014/0198255 A1* | 7/2014 | Kegasawa | H04N 5/91 348/571 |
| 2017/0187998 A1* | 6/2017 | Xiao | H04N 9/3141 |

* cited by examiner

Primary Examiner — Sherrie Hsia
(74) Attorney, Agent, or Firm — Michelle F. Murray; Charles A. Brill; Frank D. Cimino

(57) ABSTRACT

Example apparatus described herein include a first circuit configured to slice an input image frame into input image slices, the first circuit including first outputs configured to output the input image slices. Described example apparatus also include digital light processing controllers (DLPCs) including first inputs coupled to the first outputs, the digital light processing controllers configured to process the input image slices to produce output image slices, the digital light processing controllers including second outputs configured to output the output image slices. Described example apparatus further include a second circuit including second inputs coupled to the second outputs, the second circuit configured to combine the output image slices to generate image frame data to provide to an input of a digital micromirror device (DMD).

20 Claims, 14 Drawing Sheets

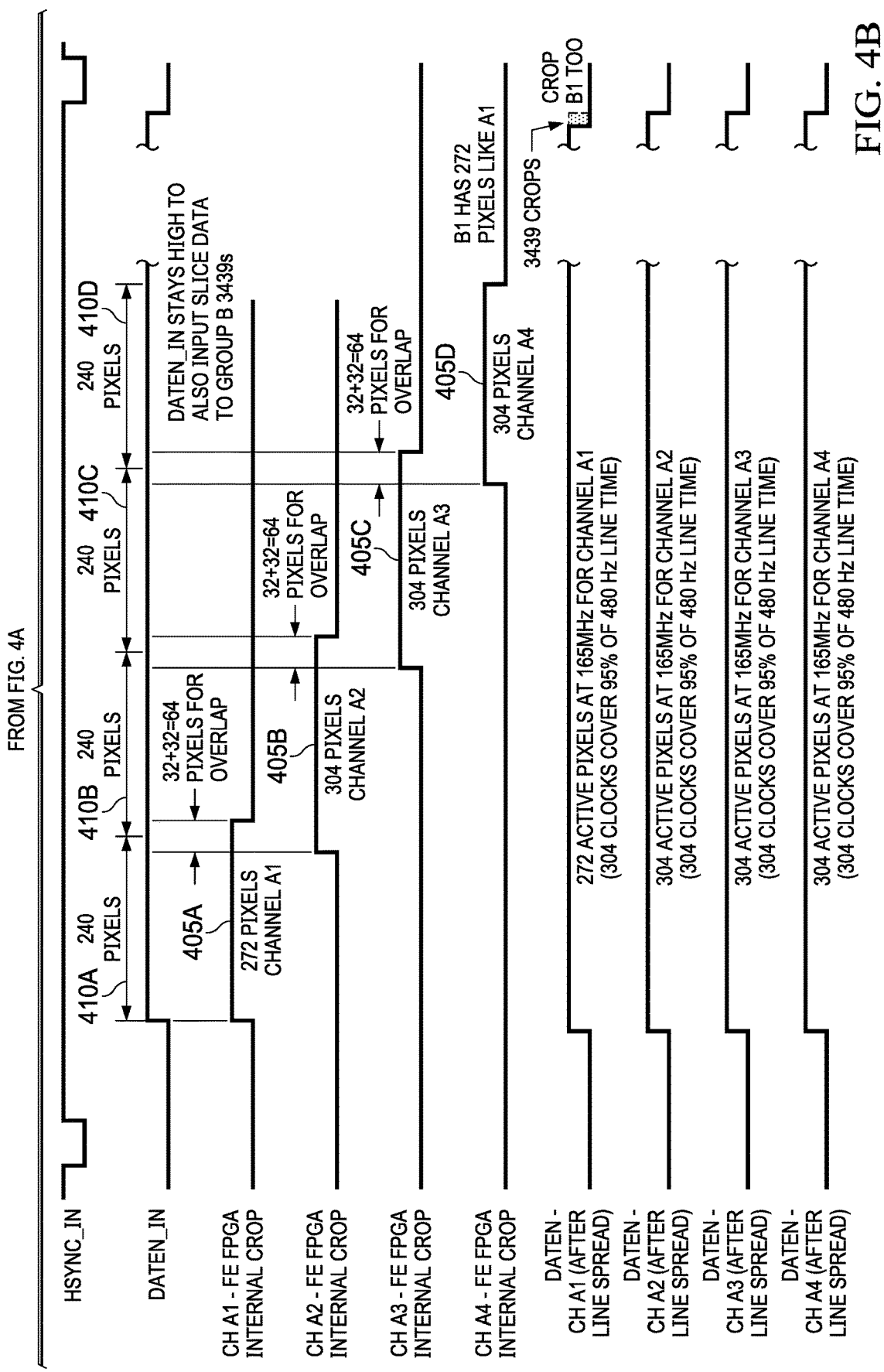

IMAGE SLICING TO GENERATE INPUT FRAMES FOR A DIGITAL MICROMIRROR DEVICE

CROSS-REFERENCE TO RELATED APPLICATION(S)

This patent application claims the benefit of and priority to U.S. Provisional Patent Application Ser. No. 62/742,558, filed on Oct. 8, 2018, which is hereby incorporated herein by reference in its entirety.

FIELD OF THE DISCLOSURE

This relates generally to image processing and, more particularly, to performing image slicing to generate input frames for a digital micromirror device.

BACKGROUND

Some video display chipsets, such as DLP® chipsets available from TEXAS INSTRUMENTS INCORPORATED, include an array of highly reflective aluminum micromirrors implemented in a digital micromirror device (DMD). The DMD is an electrical input, optical output micro-electrical-mechanical system (MEMS) that performs high speed, efficient, and reliable spatial light modulation based on input image frame data applied to the DMD. Some DMDs include two input interfaces, such as a left frame input interface and a right frame input interface, such that one input interface (e.g., the left frame input interface) accepts a first half (e.g., the left half) of an input image frame data, and the other input interface (e.g., the right frame input interface) accepts a second half (e.g., the right half) of the input image frame data. In some example video display chipsets, DMD controllers, such as TI's DLP controllers (DLPCs), are used to prepare the input image frame data to be applied to the input interfaces of the DMD. For example, two DLPCs may be used to drive a DMD, with one DPLC preparing the first half (e.g., the left half) of the input image frame data for the DMD, and the other DPLC preparing the second half (e.g., the right half) of the input image frame data for the DMD.

SUMMARY

An example apparatus performs image slicing to generate input frame data for a digital micromirror device. The example apparatus includes a first circuit configured to slice an input image frame into input image slices, the first circuit including first outputs configured to output the input image slices. The example apparatus also includes digital light processing controllers including first inputs coupled to the first outputs, the digital light processing controllers configured to process the input image slices to produce output image slices, the digital light processing controllers including second outputs configured to output the output image slices. The example apparatus further includes a second circuit including second inputs coupled to the second outputs, the second circuit configured to combine the output image slices to generate image frame data to provide to an input of the digital micromirror device.

Another example apparatus performs image slicing to generate input frame data for a digital micromirror device. The example apparatus includes a first circuit including an input interface configured to accept an input image frame, a first group of output interfaces configured to output a first group of input image slices of the input image frame, and a second group of output interfaces configured to output a second group of input image slices of the input image frame. The example apparatus also includes a first group of digital light processing controllers including a first group of inputs coupled to the first group of output interfaces, the first group of digital light processing controllers configured to process the first group of image slices to output a first group of output image slices, the first group of digital light processing controllers including a third group of outputs to output the first group of output image slices. The example apparatus also includes a second group of digital light processing controllers including a second group of inputs coupled to the second group of output interfaces, the second group of digital light processing controllers configured to process the second group of image slices to output a second group of output image slices, the second group of digital light processing controllers including a fourth group of outputs to output the first group of output image slices. The example apparatus further includes a second circuit including: (i) a first group of input interfaces coupled to the third group of outputs, the first group of input interfaces configured to accept the first group of output image slices from the first group of digital light processing controllers, (ii) a second group of input interfaces coupled to the fourth group of outputs, the second group of input interfaces configured to accept the second group of output image slices from the second group of digital light processing controllers, (iii) a first output interface configured to output image data corresponding to a selected one of the first group of output image slices to a left frame input of the digital micromirror device, and (iv) a second output interface configured to output image data corresponding to a selected one of the second group of output image slices to a right frame input of the digital micromirror device.

An example method performs image slicing to generate input frame data for a digital micromirror device. The example method includes slicing, with a first logic circuit, an input image frame into a first group of input image slices and a second group of input image slices. The example method also includes processing, with a first group of digital light processing controllers, the first group of input image slices to determine a corresponding first group of output image slices, and processing, with a second group of digital light processing controllers, the second group of input image slices to determine a corresponding second group of output image slices. The example method further includes combining, with a second logic circuit, the first group of output image slices to generate first image frame data to provide to a first input of the digital micromirror device, and combining, with the second logic circuit, the second group of output image slices to generate second image frame data to provide to a second input of the digital micromirror device.

BRIEF DESCRIPTION OF THE DRAWINGS

FIGS. 4A-B illustrate example image slicing operations performed by the example front-end circuit of FIGS. 2-3.

DETAILED DESCRIPTION

Figure 1:
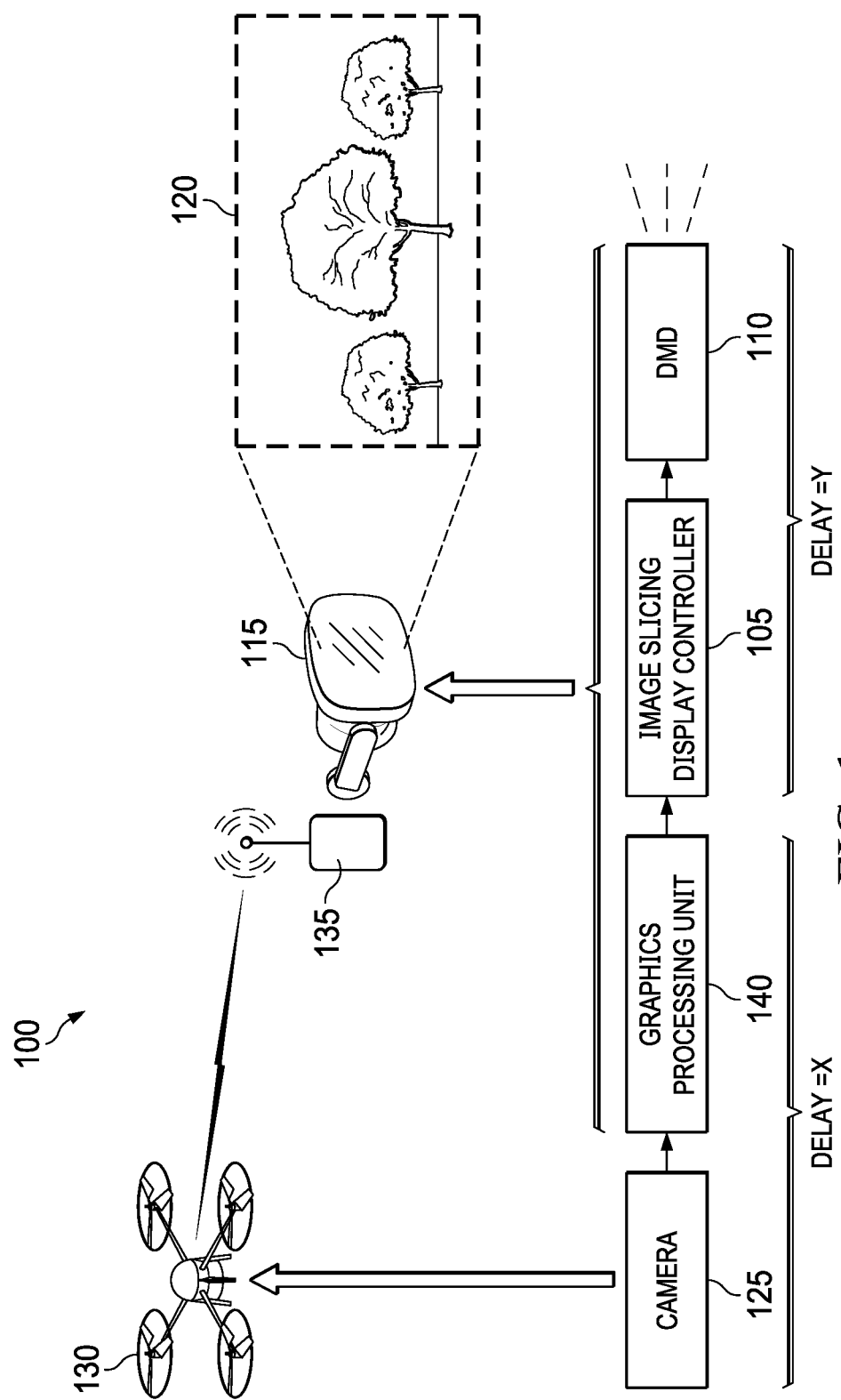
FIG. 1 is a block diagram of an example environment of use for an example image slicing display controller to perform image slicing to generate input frames for a digital micromirror device in accordance with teachings of this disclosure.

The figures are not to scale. In general, the same reference numbers will be used throughout the drawing(s) and accompanying written description to refer to the same or like parts, elements, etc. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Example methods, apparatus, systems and articles of manufacture (e.g., physical storage media) implement image slicing to generate input frames for a digital micromirror device. As described above, video display chipsets, such as TI's DLP® chipsets, include a DMD with an array of highly reflective aluminum micromirrors to perform spatial light modulation of input image frame data. Some such DMDs split the input image frame data into two halves for processing and, as such, include a first input and a second input to accept the first half of the input image frame data and the second half of the input image frame data, respectively. For example, the first half of the input image frame data may correspond to the left half of the input image frame data, the second half of the input image frame data may correspond to the right half of the input image frame data and, thus, the first input may correspond to a left frame input interface and the second input may correspond to a left frame input interface. Furthermore, some example video display chipsets include two DMD controllers, such as two of TI's DLPCs, to prepare the input image frame data to be applied to the input interfaces of the DMD. For example, a first DPLC is connected to the left frame input interface of the DMD and prepares the left half of the input image frame data, also referred to herein as the left frame image data, to apply to the left frame input interface of the DMD. Similarly, a second DPLC is connected to the right frame input interface of the DMD and prepares the right half of the input image frame data, also referred to herein as the right frame image data, to apply to the right frame input interface of the DMD.

In some prior video display systems employing DMDs, the input frame rate and the display frame rate is a function of the input frame rate supported by the DMD controllers, (e.g., the DLPCs). For example, the input frame rate supported by a DLPC may be limited to 120 Hertz (Hz). However, some video display applications, such as gaming displays, near-eye headsets, light field monitors, etc., may require higher frame rates to achieve acceptable video display quality.

Example video display solutions described herein implement image slicing to generate input frames for DMDs, enabling those solutions to achieve higher input frame rates and, thus, higher display frame rates that such prior video display systems by increasing the number of DMD controllers (e.g., DLPCs) driving the DMD, thereby increasing the video display system's net image processing bandwidth. In example image slicing video display solutions described herein, each DMD controller (e.g., DLPC) is responsible for just a fraction of the image processing bandwidth relative to prior video display system implementation. This is achieved by adding a front-end circuit, such as a front-end field programmable gate array (FPGA), structured to receive input image frames (e.g., video) at a high data rate and then divide a given input frame into multiple slices which are provided to respective ones of the DMD controllers (e.g., DLPCs). In this way, the net output bandwidth from the front-end circuit is divided among the DMD controllers (e.g., DLPCs) driving the DMD.

In some described example image slicing video display solutions, each DMD controller (e.g., DLPC) processes a respective vertical slice of the given input image frame, rather than an entire half of the input image frame, thereby resulting in a reduction of the image processing bandwidth used by the DMD controller (e.g., DLPC). Described example image slicing video display solutions further include an example stitching circuit to combine the output vertical image slices produced by the DMD controllers (e.g., DLPCs) to form the left frame image data to apply to the left frame input interface of the DMD, and to form the right frame image data to apply to the right frame input interface of the DMD. In some examples, the stitching circuit is implemented with a stitching FPGA that combines the output vertical image slices produced by the DMD controllers (e.g., DLPCs) using time-division multiplexing such that the DMD controllers (e.g., DLPCs) take turns providing their respective output vertical image slice data to the appropriate left/right frame input interface of the DMD. In some described examples, the stitching circuit is implemented with tristate busses that enable tristate multiplexing of the outputs of the DMD controllers (e.g., DLPCs), thereby allowing the DMD controllers to take turns providing their respective output vertical image slice data to the appropriate left/right frame input interface of the DMD. In some described examples, daisy chaining of the DMD controllers (e.g., DLPCs) is used to combine the output vertical image slices produced by the DMD controllers (e.g., DLPCs) to form the left/right frame image data to apply to the left/right frame input interfaces of the DMD. These and other example methods, apparatus, systems and articles of manufacture (e.g., physical storage media) to implement image slicing to generate input frames for a digital micromirror device.

Turning to the figures, FIG. 1 illustrates a block diagram of an example environment of use 100 for an example image slicing display controller 105 to perform image slicing to generate input frames for an example DMD 110 in accordance with teachings of this disclosure. The example environment of use 100 is illustrated as an example augmented reality (AR) system 100 in which the DMD 110 drives an example near-eye device (NED) 115, which is depicted as an example AR headset 115, to display an example AR video presentation 120 that blends real-world video images with computer-generated video images. In the illustrated example, the real-world images are captured with an example camera 125 mounted on an example autonomous vehicle (AV) 130, depicted as an example flying drone 130 in FIG. 1. The drone 130 transmits the video images captured with its camera 125 to an example transceiver 135 included in the AR headset 115. For example, the transceiver 135 may be a one-way radio frequency (RF) receiver, a two-way RF transceiver, a wireless local area network (WLAN) transceiver, a Bluetooth transceiver, and infrared (IR) interface, etc.

In the example AR system 100 of FIG. 1, the AR headset 115 includes an example graphics processing unit (GPU) 140 (possibly along with other image processing chips, processors, etc.), the image slicing display controller 105 and the DMD 110. In the illustrated example, the GPU 140 accepts the real-world video images received from the camera 125 of the drone 130. The GPU 140 also produces and/or otherwise obtains (e.g., from one or more external sources) one or more computer-generated images (e.g., corresponding to still images and/or video), and overlays the computer-generated images onto the real-world video images to generate the input image frames to be processed by the image slicing display controller 105 and the DMD 110. As described in further detail below, the image slicing display controller 105 includes circuitry (e.g., DLPCs) that slices an input image frame (e.g., received from GPU 140) into multiple image slices to be processed in parallel by multiple DMD controllers (e.g., DLPCs) and stitches the resulting output image slices to form image data to input to the DMD 110.

In the AR system 100, image processing latency can impact system performance. For example, with excessive image processing latency, there can be a misalignment between overlaid AR content and real-world objects, an undesirable delay between user input commands and the resulting video display presentation, etc. If such latency is detectable, the user of the AR system 100 can lose the sense of realism intended to be achieved by the AR video display presentation.

In the illustrated example of FIG. 1, the latency of the AR system 100 is a function of the image generation lag time introduced by the camera 125 and the GPU 140 (represented by "X" in FIG. 1), and the image processing time associated with the video display chipset including the image slicing display controller 105 and the DMD 110 (represented by "Y" in FIG. 1). Thus, the total latency is given by X+Y. (In video systems in which the input image frames are entirely computer generated, such as video gaming systems, there may be no camera 125 and the lag time X is due to the GPU 140.) Image slicing as implemented by the image slicing display controller 105 reduces the image processing time Y and, thus, can reduce the total latency to a level that is undetectable or has negligible impact on system performance.

Other example systems in which the image slicing display controller 105 can be used to drive the DMD 110 to achieve low latency and high image frames rates include virtual reality (VR) systems employing VR NEDs (e.g., such as VR headsets), light field monitors, light field projectors, etc. For example, to achieve acceptable performance, 3D video imaging systems, such as 3D AR headsets, 3D VR headsets, 3D light field monitors, 3D light field projectors, etc., may require input frame rates higher than those achievable by prior video display chipsets. For example, displaying 3D images using prior stereoscopic methods may be possible with lower input frame rates of 120 Hz, which can achieve an acceptable 60 Hz display rate for each eye. However, displaying 3D images using light fields or multi focal planes may require much higher input frame rates to achieve an acceptable 60 Hz display rate. For example, in a multi focal 3D imaging system supporting six optical focal planes, an input frame rate of 6×60=360 Hz may be required. Image slicing as implemented by the image slicing display controller 105 enables such higher input frame rates to be achieved.

Figure 2:
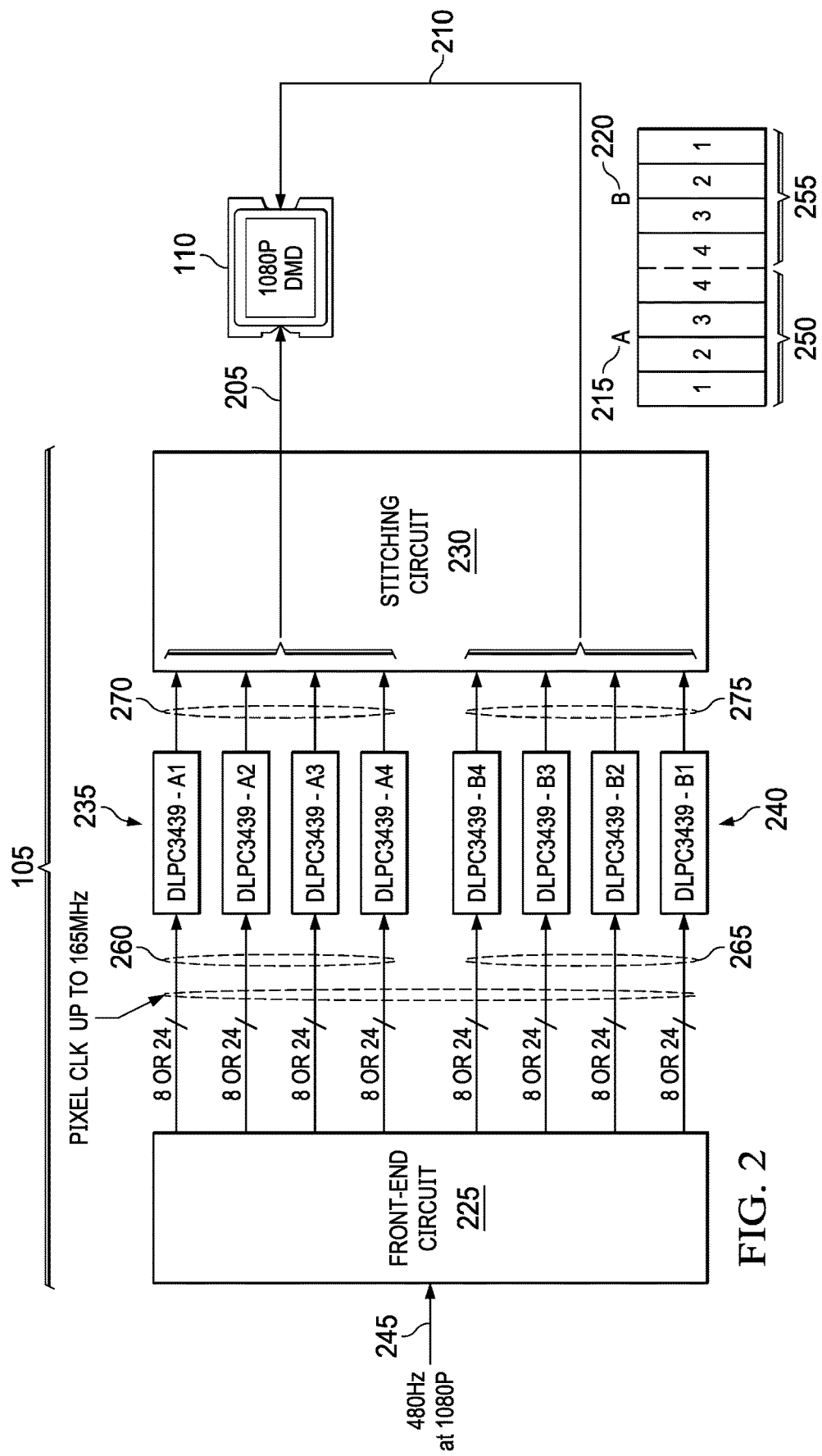
FIG. 2 is a block diagram of an example implementation of the image slicing display controller of FIG. 1.

FIG. 2 illustrates a block diagram of an example implementation of the image slicing display controller 105 of FIG. 1. In the illustrated example of FIG. 2, the image slicing display controller 105 is in communication with (e.g., electrically coupled to) an example left frame input interface 205 (or, more generally, an example first input 205) and an example right frame input interface 210 (or, more generally, an example second input 210) of the DMD 110. The left frame input interface 205 is to accept example left frame input image data 215 (also labeled "A" in FIG. 2) to be processed by the DMD 110, whereas the right frame input interface 210 is to accept example right frame input image data 220 (also labeled "B" in FIG. 2) to be processed by the DMD 110. For example, if the input image frame to be processed by the DMD 110 has a total size of 1920 horizontal×1080 vertical pixels, then the left frame input image data 215 corresponds to the leftmost 960×1080 pixels of the input image frame, and the right frame input image data 220 corresponds to the rightmost 960×1080 pixels of the input image frame.

In the illustrated example of FIG. 2, the image slicing display controller 105 includes an example front-end circuit 225, an example stitching circuit 230, a first group of example DMD controllers 235 associated with the left frame input image data 215 (or, more generally, a first portion 215 of the input image frame data), and a second group of example DMD controllers 240 associated with the right frame input image data 220 (or, more generally, a second portion 220 of the input image frame data). In the illustrated example, the first group of DMD controllers 235 and the second group of DMD controllers 240 are illustrated as a first group of example DLPCs 235 and a second group of example DLPCs 240, respectively. Also, although the front-end circuit 225 and the stitching circuit 230 are illustrated as being implemented by FPGAs corresponding respectively to an example front-end FPGA 225 and an example stitching FPGA 230, the front-end circuit 225 and/or the stitching circuit 230 can be implemented using any other type/number of logic circuits, logic gates, processors, etc.

In the illustrated example, the front-end circuit 225 is to slice an input image frame applied to an example input interface 245 of the front-end circuit 225 into a first group of input image slices 250 associated with the first group of DMD controllers 235, and a second group of input image slices 255 associated with the second group of DMD controllers 240. For example, if the first group of DMD controllers 235 includes four DMD controllers 235 labeled A1-A4 and the second group of DMD controllers 240 includes four DMD controllers 240 labeled B1-B4, as shown, then the front-end circuit 225 slices the input image frame into eight slices such that the four leftmost slices 250 are applied to the first group of example DMD controllers 235 and the four rightmost slices 255 are applied to the second group of DMD controllers 235. However, the first group of example DMD controllers 235 can include any number of DMD controllers 235, the second group of example DMD controllers 240 can include any number of DMD controllers 240, and the front-end circuit 225 can slice an input image frame applied to the input interface 245 of the front-end circuit 225 into a first group of input image slices 250 and a second group of input image slices 255 having respective numbers of slices corresponding to the number of DMD controllers 235 and the number of DMD controllers 240. Accordingly, the front-end circuit 225 is an example of means for slicing an input image frame into a first group of input image slices and a second group of input image slices.

In the example of FIG. 2, the input interface 245 of the front-end circuit 225 can be implemented by any type of hardware data interface, such as a parallel data interface that accepts multiple pixels per clock cycle or serial data interface that accepts a single pixel per cycle, that supports a bandwidth sufficient to accept the input image frames at the target input frame rate and target pixel bit width, either or both of which may be user configurable based on one or more inputs. For example, as shown in FIG. 2, the target pixel bit width could be 24 bits/pixel for color pixels in red-green-blue (RGB) format, 8 bits/pixel for monochrome pixels, etc. If the input image frame contains monochrome pixels having 8 bits/pixel, the input frame rate is 480 Hz, and the size of the input image frame is 1920×1080 pixels, the bandwidth supported by the input interface 245 is to be about 8.1 Gigabits/second, as shown.

In the illustrated example, the front-end circuit 225 includes a first group of example output interfaces 260 to output the first group of input image slices 250 to the first group of example DMD controllers 235, and a second group of example output interfaces 265 to output the second group of input image slices 255 to the second group of example DMD controllers 240. For example, the output interfaces 260 and 265 of the front-end circuit 225 may be parallel or serial interfaces that support pixels with a configurable bit width of 24 bits/pixel for color pixels, 8 bits/pixel for monochrome pixels, etc. However, the bandwidth to be supported by the output interfaces 260 and 265 may be substantially less than the bandwidth to be supported by the input interface 245 of the front-end circuit 225 because the input image slices 250 and 255 are a fraction of the size of the total input image frame applied to the input interface 245 of the front-end circuit 225.

The first group of DMD controllers 235 then process, in parallel, the first group of input image slices 250 output from the front-end circuit 225 via the first group of output interfaces 260 to output a corresponding first group of output image slices such that each DMD controller 235 processes a corresponding one of the input image slices 250 to output a corresponding one of the first group of output image slices. Similarly, the second group of DMD controllers 240 process, in parallel, the second group of input image slices 255 output from the front-end circuit 225 via the second group of output interfaces 265 to output a corresponding second group of output image slices such that each DMD controller 240 processes a corresponding one of the input image slices 255 to output a corresponding one of the second group of output image slices. The DMD controllers 235 and 240 can perform any appropriate image processing on their respective image slices 250 and 255. For example, such processing may include image resizing, applying gamma corrections, performing color space conversion, formatting the pixel data into a data format expected by the DMD 110, etc. Accordingly, the first group of DMD controllers 235 is an example of means for processing a first group of input image slices to output a first group of output image slices, and the second group of DMD controllers 240 is an example of means for processing a second group of input image slices to output a second group of output image slices.

In the illustrated example, the stitching circuit 230 includes a first group of example input interfaces 270 to accept the first group of output image slices output from the first group of DMD controllers 235 such that each one of the input interfaces 270 of the stitching circuit 230 accepts an output image slice from a corresponding one of the first group of DMD controllers 235. The stitching circuit 230 also includes a second group of example input interfaces 275 to accept the second group of output image slices output from the second group of DMD controllers 240 such that each one of the input interfaces 275 of the stitching circuit 230 accepts an output image slice from a corresponding one of the second group of DMD controllers 240. In the illustrated example, the stitching circuit 230 combines the first group of output image slices input by the first group of DMD controllers 235 to the first group of example input interfaces 270 to generate the left frame image data 215 to input to the left frame input interface 205 of the DMD 110 (or, more generally, to generate the first portion 215 of the image frame data to input to the first input 205 of the DMD 110). The stitching circuit 230 also combines the second group of output image slices input by the second group of DMD controllers 240 to the second group of example input interfaces 275 to generate the right frame image data 220 to input to the right frame input interface 210 of the DMD 110 (or, more generally, to generate the second portion 220 of the image frame data to input to the second input 210 of the DMD 110). Accordingly, the stitching circuit 230 is an example of means for combining a first group of output image slices to generate left frame image data to input to the DMD 110, and for combining a second group of output image slices to generate right frame image data to input to the DMD 110.

In the illustrated example slicing display controller 105 of FIG. 2, the example front-end circuit 225 is structured to slice an input image frame into two groups of image slices associated respectively with two groups of example DMD controllers 235/240, and the example stitching circuit 230 is structured to combine the output image slices from the two respective groups of example DMD controllers 235/240 to form two respective portions 215/220 of the input image frame data to provide to the corresponding first and second inputs 205/210 of the DMD 110. However, the example slicing display controller 105 is not limited to such an example structure. Rather, in other examples, the slicing display controller 105 can be structured to support DMDs with any number of inputs such that the slicing display controller 105. In such other example, the slicing display controller 105 can include a number of groups of the DMD controllers corresponding to the number of inputs of the DMD, with the front-end circuit 225 of such examples being structured to slice the input image frame into a number of groups of image slices corresponding to the number of groups of the DMD controllers, and with the stitching circuit 230 of such examples being structured to combine the output image slices from the respective groups of the DMD controllers into a number of portions of input image frame data corresponding to the number of inputs to the DMD. For example, if the DMD supports a single input to accept all of the input image frame data to be processed by the DMD, then the slicing display controller 105 in such an example may include a single group of DMD controllers (e.g., such as the DMD controllers 235). In such an example, the front-end circuit 225 may be structured to slice the input image frame into one group (e.g., a first group) of image slices associated with the single group of DMD controllers (e.g., the first DMD controllers 235). In such an example, the stitching circuit 230 may be structured to combine the output image slices from the single group of DMD controllers (e.g., the first DMD controllers 235) to form input image frame data to provide to the single input (e.g., the first input) of the DMD in that example.

Figure 3:
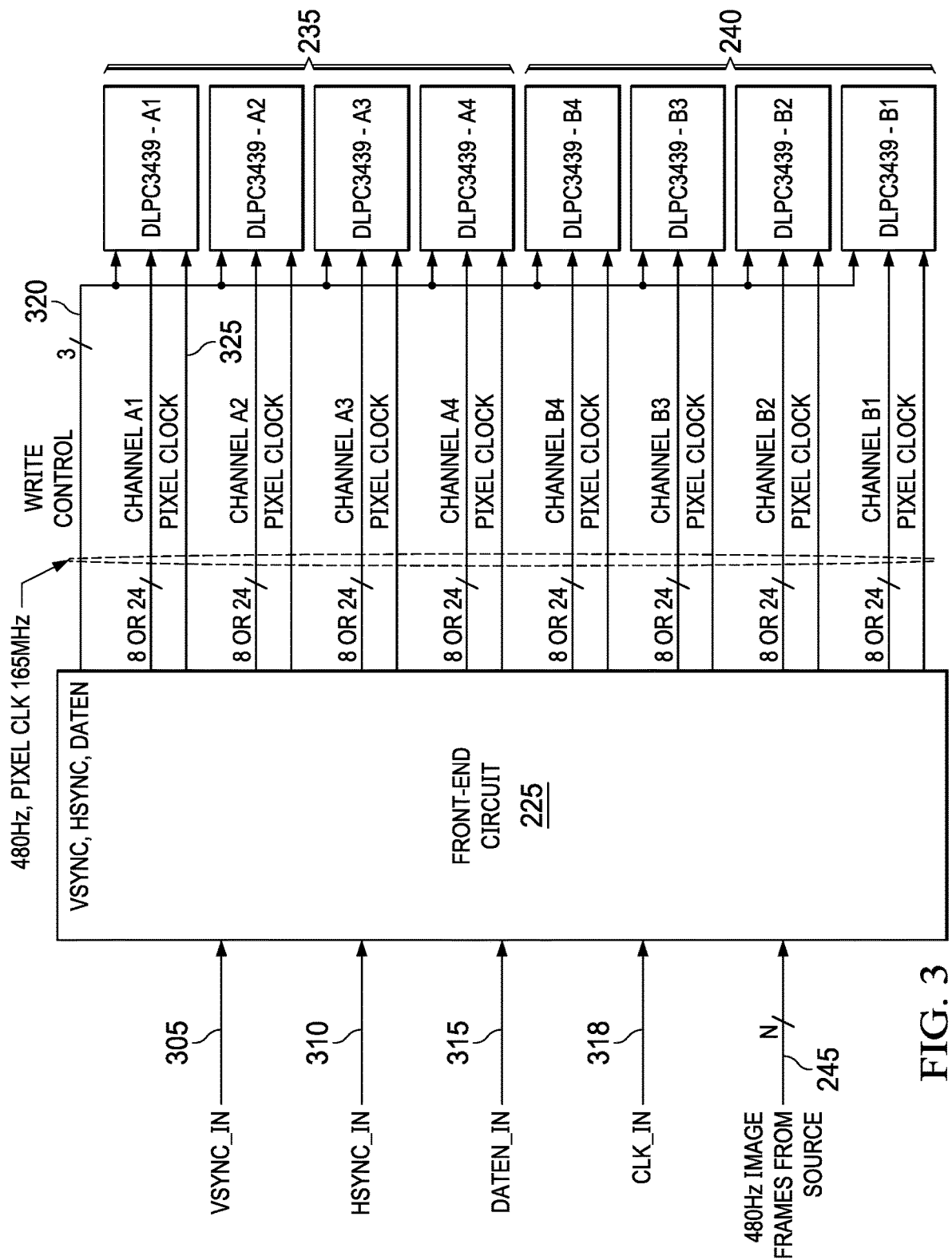
FIG. 3 is a detailed view of an example front-end circuit included in the example image slicing display controller of FIG. 2.

FIG. 3 illustrates a detailed view of the example front-end circuit 225 of FIG. 2. In the illustrated example of FIG. 2, the front-end circuit 225 is shown in communication with (e.g., electrically coupled to) the first group of DMD controllers 235 (e.g., DLPCs 235) and the second group of example DMD controllers 240 (e.g., DLPCs 240). Also shown in the example of FIG. 3 are the input interface 245 of the front-end circuit 225 (which is an N-bit parallel data interface in the illustrated example), the first group of output interfaces 260 of the front-end circuit 225 (which interface with the respective inputs of the first group of DMD controllers 235 and are labelled Channel A1-A4 in the FIG. 3), and the second group of output interfaces 265 of the front-end circuit 225 (which interface with the respective inputs of the first group of DMD controllers 240 and are labelled Channel B1-B4 in the FIG. 3).

The detailed view of FIG. 3 also illustrates further inputs to the front-end circuit 225, which include an example vertical sync input (VSYNC_IN) 305, an example horizontal sync input (HSYNC_IN) 310, an example data enable input (DATA_EN) 315 and an example clock input (CLK_IN) 318. Operation of the front-end circuit 225 based on input signals applied to the vertical sync input (VSYNC_IN) 305, horizontal sync input (HSYNC_IN) 310, data enable input (DATA_EN) 315 and clock input (CLK_IN) 318 is described in further detail below in connection with FIGS. 4A-B.

The detailed view of FIG. 3 also illustrates further outputs of the front-end circuit 225, which include example write control outputs 320 and one or more example pixel clock outputs 325. In the illustrated example, the write control outputs 320 output signals corresponding to the vertical sync input (VSYNC_IN) 305, horizontal sync input (HSYNC_IN) 310 and data enable input (DATA_EN) 315 to enable those inputs to control operation of the first group of DMD controllers 235 (e.g., DLPCs 235) and the second group of example DMD controllers 240 (e.g., DLPCs 240). The pixel clock output 325 is based on the clock input (CLK_IN) 318 and may be implemented as one output to be coupled (e.g., electrically coupled) to some or all of the clock inputs of the first group of DMD controllers 235 (e.g., DLPCs 235) and the second group of example DMD controllers 240 (e.g., DLPCs 240). Alternatively, the pixel clock output 325 may be implemented as multiple outputs (as shown in FIG. 3), which are coupled (e.g., electrically coupled) individually to the respective clock inputs of the first group of DMD controllers 235 (e.g., DLPCs 235) and the second group of example DMD controllers 240. As described in further detail below, the pixel clock output 325 provides a pixel clock signal to be used by the first group of DMD controllers 235 (e.g., DLPCs 235) and the second group of example DMD controllers 240 to process the pixels of their respective input image slices. As described in further detail below, the pixel clock rate is based on the frame rate associated with the input frames applied to the input interface 245 of the front-end circuit 225, a largest width (in pixels) of the lines of the input image slices to be processed by the first group of DMD controllers 235 (e.g., DLPCs 235) and the second group of example DMD controllers 240, a number of lines included in an input frame (e.g., such as 1080 lines for a 1980×1080 sized image), and a target amount of vertical blanking between image frames.

Figure 4A:
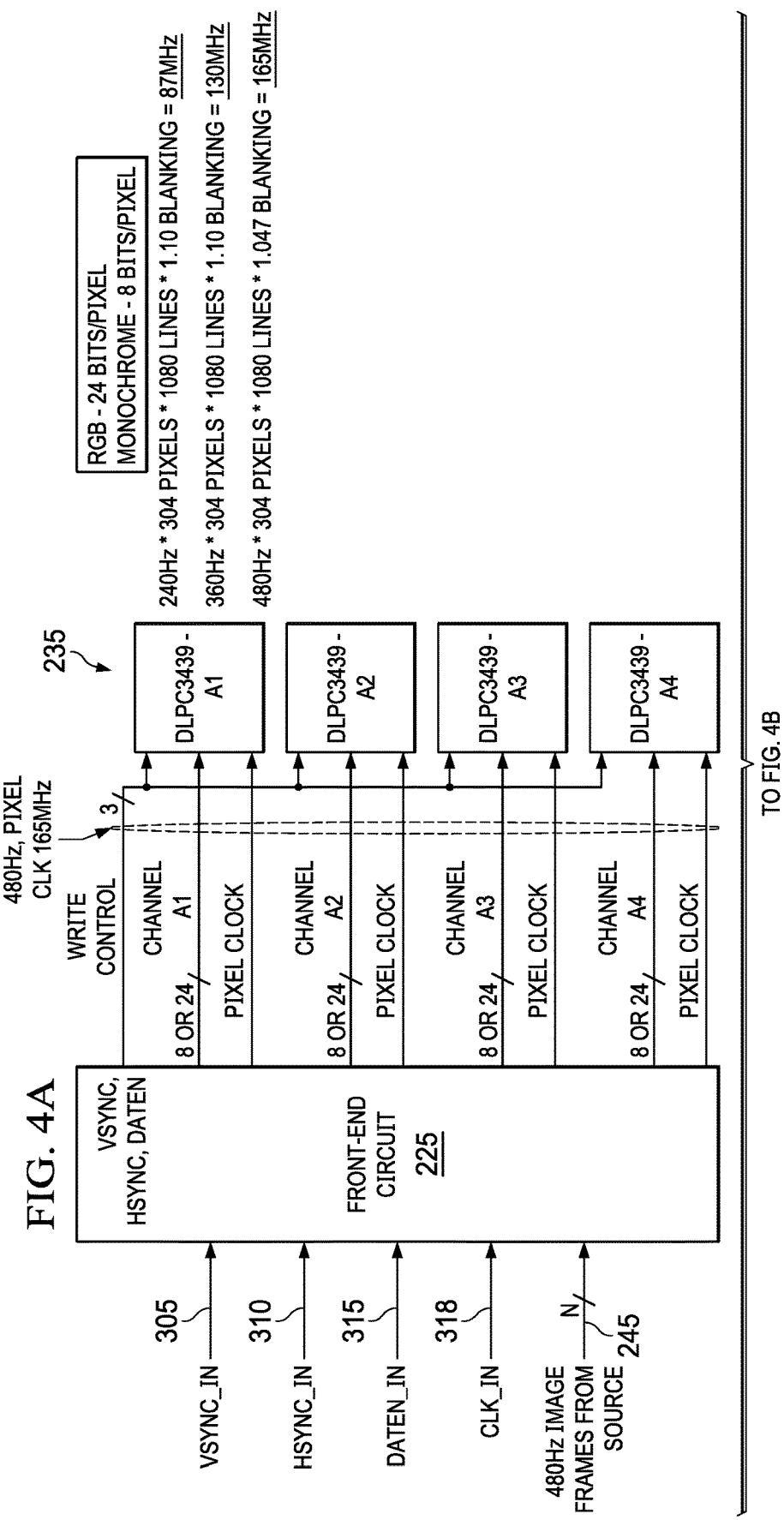

FIGS. 4A-B illustrate example operations performed by the front-end circuit 225 of FIGS. 2-3 to perform image slicing in accordance with teachings of this disclosure. For convenience, FIGS. 4A-B illustrate operations performed by the front-end circuit 225 in conjunction with the first group of DMD controllers 235 (e.g., DLPCs 235), but those example operations continue to be performed for the second group of example DMD controllers 240 (e.g., DLPCs 240). The example operations performed by the example front-end circuit 225 as illustrated in FIGS. 4A-B are based on the following principles.

1) The front-end circuit 225 double buffers input lines of the input image applied to the input interface 245 such that one input line can be sliced as described in further detail below while a subsequent input line is being stored into a line memory. Likewise, the DMD controllers 235 and 240 double-buffer input lines of their respective input image slices such that each DMD controller can process one input line of an input image slice while a subsequent input line of the input image slice is being stored into the line memory.

2) The vertical image slices applied to the DMD controllers 235 and 240 can be configured (e.g., based on control input) as one, two or three 8-bit channels based on the type of pixels included in the input image frames. For example, one 8-bit channel can be used for 8-bit monochrome pixels, two 8-bit channels can be used for 16-bit color pixels represented in luminance-chrominance (YC) format, and three 8-bit channels can be used for 24-bit color pixels represented in RGB format.

3) The maximum input frame rate for input images applied to the input interface 245 of the front-end circuit 225 is based on the maximum input pixel clock rate supported by the DMD controllers 235 and 240. In the illustrated example of FIGS. 4A-B, the maximum input frame rate is configured to be 480 Hz, although the maximum input frame rate could be higher or lower in other examples. Furthermore, input frame rates lower than the supported maximum rate, such as 360 Hz, 240 Hz, etc., in the illustrated example, can also be configured.

4) The front-end circuit 225 creates the vertical image slices to be applied to the DMD controllers 235 and 240 with pixel overlap to enable proper dithering and processing of the image slices by respective ones of the DMD controllers 235 and 240. For example, the image processing algorithms implemented by a given one of the DMD controllers 235 and 240 may require a number of pixels adjacent to the main pixels included in an image slice being processed by that given DMD controller. In the illustrated example of FIGS. 4A-B, each DMD controller 235/240 is configured to accept up to a 304×1080 vertical slice of the input image (e.g., vertical slices with 304 pixels per line for a 1980×1080 input image having 1080 lines), although other configurations are possible in other examples. In the illustrated example, the line width of 304 pixel for the input image slices is based on dividing the input image width of 1980 pixels per line (e.g., the total number of pixels included in the image line) into 8 slices (e.g., the total number of image slices) corresponding to the 8 DMD controller 235 and 240, and further including 32 pixels of overlap on each side of a given vertical slice, that is, (1920 pixels per line/8 slices)+32 pixels of left-side overlap+32 pixels of right-side overlap=304 pixels per line in an input image slice, such that the number of pixels of left-side overlap is equal to the number of symbols of right-side overlap, in this example.

5) To reduce the pixel clock rate used to drive the DMD controller 235 and 240, the front-end circuit 225 spreads the lines of the input image slices applied to the DMD controller 235 and 240 over most of the time associated with a line of the input frame, with a margin to provide a target amount of vertical blanking. For example, the front-end circuit 225 may spread the lines of the input image slices applied to the DMD controller 235 and 240 over 95% of the time associated with a line of the input frame. This process is referred to herein as "line spreading" and is made possible by the double buffering of the input lines of the input image frame in the front-end circuit 225. In the illustrated example, the front-end circuit 225 double buffers input lines of an image frame, but does not to double buffer entire image frames themselves. By not double buffering entire image frames, the front-end circuit 225 of the illustrated example avoids incurring a processing latency associated with the time for buffering an image frame, and also avoids the cost of including an additional frame memory. The example front-end circuit 225 is able to avoid double buffering entire image frames in favor of double buffering just input lines of a frame because the example front-end circuit 225 creates vertical image slices of an input image, rather than horizontal image slices of the input image.

6) The sequence of operations to slice an input image into image slices is reset based on the vertical sync input (VSYNC_IN) 305 (e.g., on the falling edge of this input signal).

With the foregoing in mind, the example operations illustrated in FIGS. 4A-B proceed as follows. The front-end circuit 225 prepares to accept an input line of the input image applied to the input interface 245 when the horizontal sync input (HSYNC_IN) 310 pulses low. Then, when the data enable input (DATA_EN) 315 goes high, the front-end circuit 225 reads the input line of the input image from the input interface 245 and stores the input line in double-buffering line memory. During a next line input cycle while the front-end circuit 225 is reading and storing the next line of the input image into the double-buffering line memory, the front-end circuit 225 crops the prior stored input image line into line segments corresponding to the vertical images slices, line spreads the line segments over the time of a line of the input image (with a margin to account for a target amount of vertical blanking) and outputs the spread lines of the vertical images slices in parallel to the respective DMD controller 235 and 240.

For example, as shown in FIGS. 4A-B, for an input image having a size of 1920×1080 pixels, the front-end circuit 225 crops an input line of the input image into 8 example overlapping subsets (line segments) of pixels corresponding to the 8 image slices to be provided to the respective DMD controller 235 and 240. The first 4 of these subsets (line segments) of pixels, labeled 405A-D, are shown in FIGS. 4A-B. The subsets of pixels 405A-D include respective main groups of pixels 410A-D that are adjacent and contain 240 pixels, which corresponds to the 1920 pixels in the input line of the input image divided by the 8 image slices. The subsets of pixels 405A-D also include groups of pixels that overlap with neighboring subsets of pixels. For example, the subset of pixels 405A corresponds to the leftmost image slice to be applied to the DMD controller A1 and includes the main group of pixels 410A and a group of pixels 415 that overlaps with the neighboring subset of pixels 405B. In the illustrated example, the group of pixels 415 includes 32 pixels and, thus, the subset of pixels 405A includes 240+32=272 pixels. However, the group of pixels 415 could include any appropriate number of overlapping pixels with the subset of pixels 405A. As another example, the subset of pixels 405B corresponds to the image slice to be applied to the DMD controller B1 and includes the main group of pixels 410B, a group of pixels 420 that overlaps with the neighboring subset of pixels 405A, and a group of pixels 425 that overlaps with the neighboring subset of pixels 405C. In the illustrated example, the groups of pixels 420 and 425 each include 32 pixels and, thus, the subset of pixels 405B includes 240+32+32=304 pixels. Table 1 lists the pixels included in the respective groups (line segments) of pixels corresponding to the respective image slices to be applied to the respective DMD controller 235 and 240.

TABLE 1

| Slice for DMD controller labeled: | Pixels included in the line segment of the image slice |
| --- | --- |
| A1 | Pixel 0 through Pixel 271 |
| A2 | Pixel 208 through Pixel 511 |
| A3 | Pixel 448 through Pixel 751 |
| A4 | Pixel 688 through Pixel 991 |
| B1 | Pixel 928 through Pixel 1231 |
| B2 | Pixel 1168 through Pixel 1471 |
| B3 | Pixel 1408 through Pixel 1711 |
| B4 | Pixel 1648 through Pixel 1919 |

Returning to FIGS. 4A-B, the front-end circuit 225 line spreads the subsets (line segments) of pixels 405A-D over the time associated with a line of the input image (with a margin to account for a target amount of vertical blanking) and outputs the spread subsets (line segments) of pixels 405A-D in parallel to the respective DMD controller 235. (Although not shown in FIGS. 4A-B, the front-end circuit 225 performs similar line spreading of the subsets of pixels to be output in parallel to the respective DMD controller 240.) Such line spreading reduces the pixel clock rate required to drive the DMD controllers 235 and 240. For example, if input image size is 1920×1080 pixels and there are 8 image slices corresponding to 8 DMD controllers 235 and 240 such that the largest width of a slice is 304 bits as shown in FIGS. 4A-B, and the input frame rate is 480 Hz and the target amount of vertical blanking is 4.7%, then the pixel clock rate is given by: 480 Hz×304 pixels×1080 lines×1.047 vertical blanking target=165 MHz. Similarly, if the input frame rate is 360 Hz and the target amount of vertical blanking is 10%, then the pixel clock rate is given by: 360 Hz×304 pixels×1080 lines×1.1 vertical blanking target=130 MHz. Similarly, if the input frame rate is 240 Hz and the target amount of vertical blanking is 10%, then the pixel clock rate is given by: 360 Hz×304 pixels×1080 lines×1.1 vertical blanking target=87 MHz. In some examples, one or more of the input image size, input frame rate, target amount of vertical blanking, number of image slices, number of overlapping pixels in each image slice group (e.g., line segment), etc., are configurable via control inputs to the front-end circuit 225.

Figure 5:
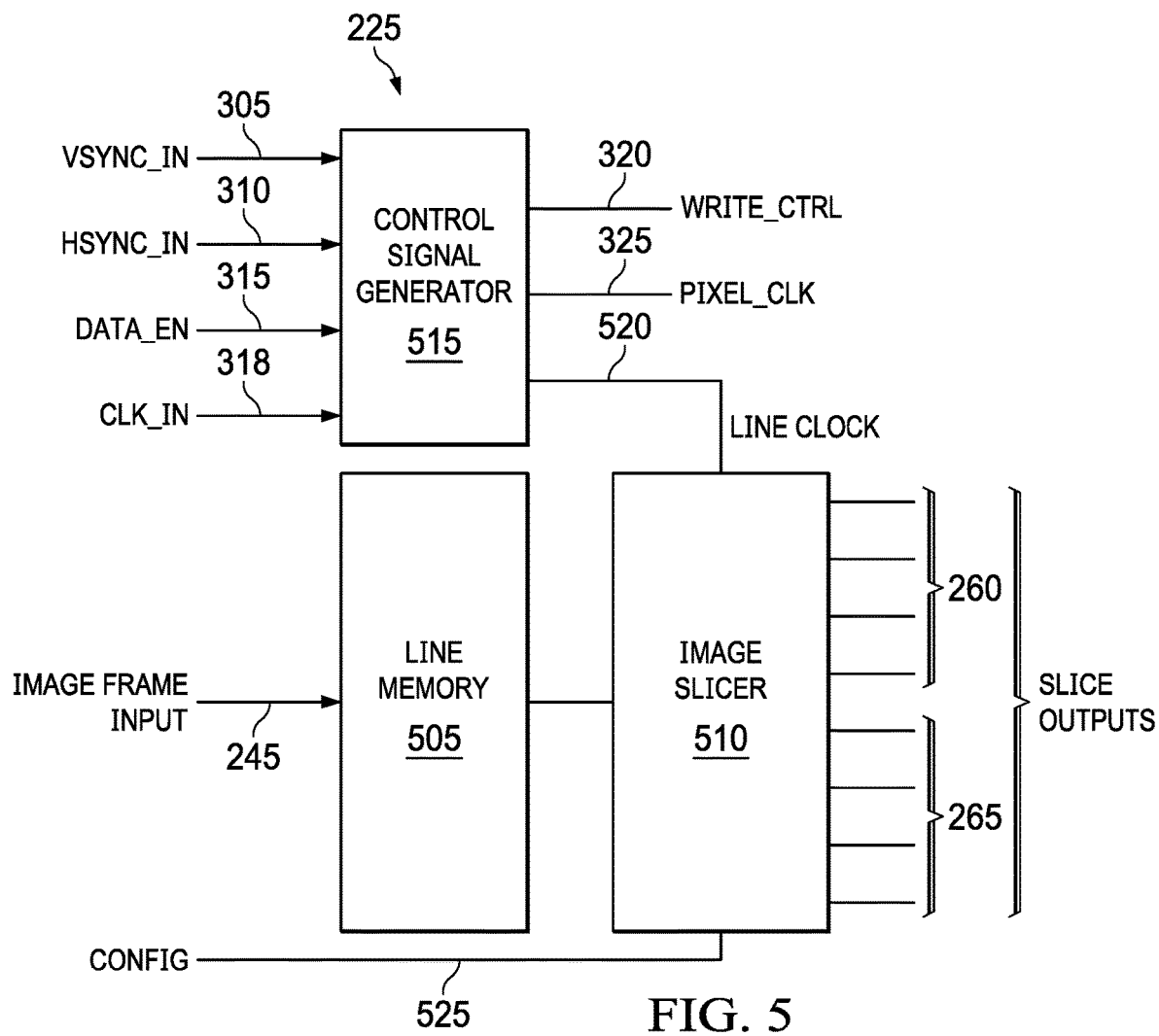
FIG. 5 is a block diagram of an example implementation of the front-end circuit of FIGS. 2-3.

FIG. 5 illustrates a block diagram of an example implementation of the front-end circuit 225 of FIGS. 2-4. The example front-end circuit 225 of FIG. 5 includes example line memory 505 to double buffer lines of an input image received via the input interface 245. The line memory 505 can be implemented by any type(s) and/or number(s) of memories, storage devices, registers, buffers, etc. The example front-end circuit 225 of FIG. 5 also includes an example image slicer 510 to slice the input image received via the input interface 245 into image slices to be output in parallel from the output interfaces 260 and 265 to the respective groups of DMD controllers 235 and 240. For example, the image slicer 510 crops the input lines of the input image stored in the line memory 505 into the respective subsets (line segments) of pixels corresponding to the image slices, and line spreads the subsets (line segments) of pixels, as described above in connection with FIGS. 4A-B.

The example front-end circuit 225 of FIG. 5 further includes an example control signal generator 515 to accept the vertical sync input (VSYNC_IN) 305, horizontal sync input (HSYNC_IN) 310, data enable input (DATA_EN) 315 and clock input (CLK_IN) 318, and generate the write control outputs 320 and pixel clock output(s) 325, as described above. In the illustrated example of FIG. 5, the control signal generator 515 also generates an example line clock signal 520 to indicate to the image slicer 510 times at which a complete lines of the input image received via the input interface 245 have been stored in the line memory 505 and are ready to be sliced.

In the illustrated example of FIG. 5, the image slicer 510 also includes an example configuration input 525 to accept configuration settings, such as the type and/or bit size of the pixels of the input image, the input image size, input frame rate, target amount of vertical blanking, number of image slices, number of overlapping pixels in each image slice group (e.g., line segment), etc. As such, the configuration input 525 can be implemented by any type(s) and/or number(s) of serial and/or parallel input interfaces, control lines, registers, etc.

Figure 6:
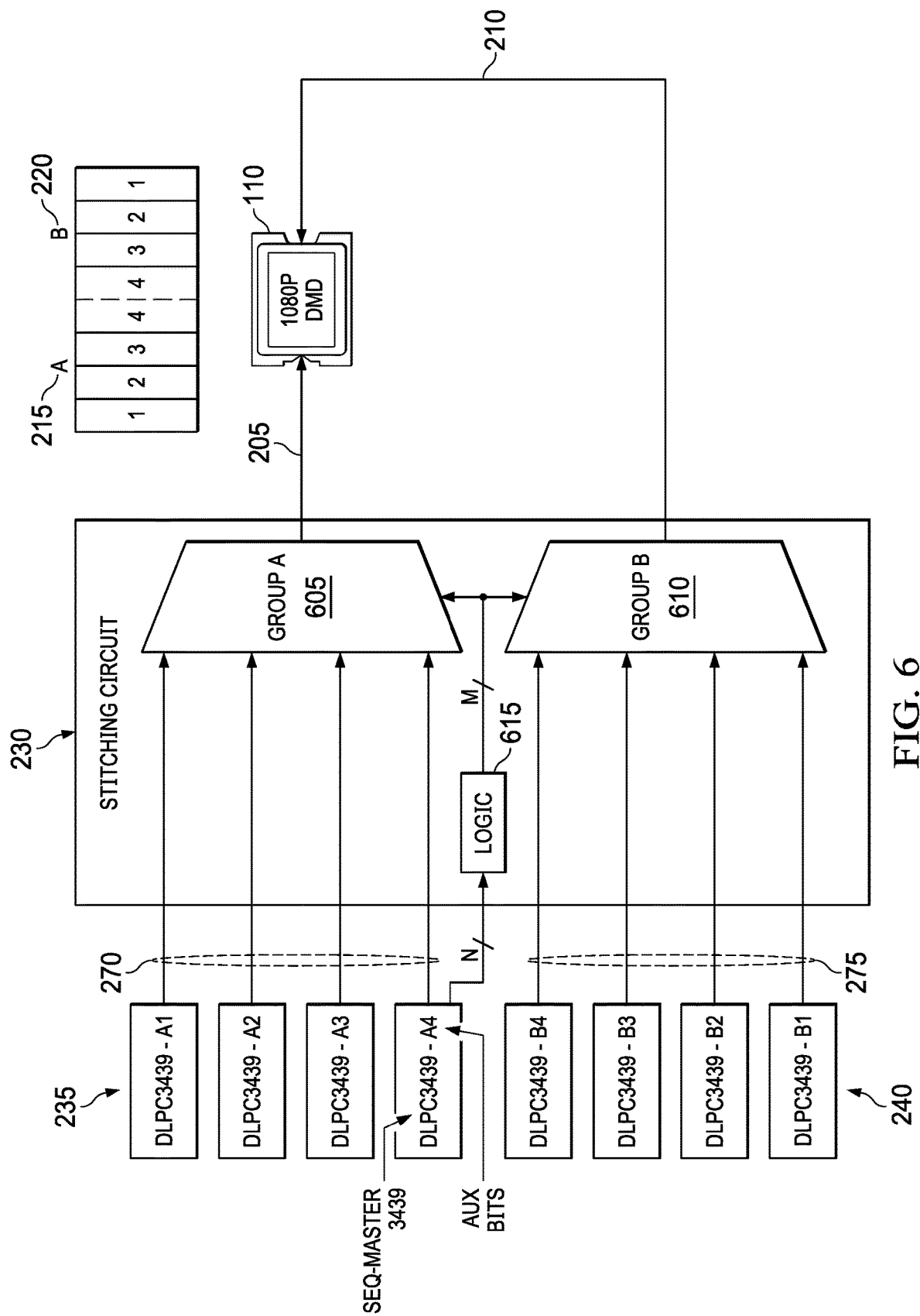
FIG. 6 is a block diagram of a first example implementation of an example stitching circuit included in the example image slicing display controller of FIG. 2.

FIG. 6 illustrates a block diagram of a first example implementation of the stitching circuit 230 of FIG. 2. In the illustrated example of FIG. 6, the stitching circuit 230 is shown in communication with (e.g., electrically coupled to) the first group of DMD controllers 235 (e.g., DLPCs 235), the second group of DMD controllers 240 (e.g., DLPCs 240) an the DMD 110. Also shown in FIG. 6 are the first group of input interfaces 270 (which accept the first group of output image slices output from the first group of DMD controllers 235), the second group of input interfaces 275 (which accept the second group of output image slices output from the second group of DMD controllers 240), the left frame input interface 205 of the DMD (which accepts the left frame input image data 215 output from the stitching circuit 230) and the right frame input interface 210 of the DMD 110 (which accepts the right frame input image data 220 output from the stitching circuit 230).

The example stitching circuit 230 of FIG. 6 includes a first example multiplexer circuit 605 to combine the first group of output image slices received via the first group of example input interfaces 270 from the first group of DMD controllers 235 to generate the left frame image data 215 to input to the left frame input interface 205 of the DMD 110. The example stitching circuit 230 of FIG. 6 also includes a second example multiplexer circuit 610 to combine the second group of output image slices received via the second group of example input interfaces 275 from the second group of DMD controllers 240 to generate the right frame image data 220 to input to the right frame input interface 210 of the DMD 110. The example stitching circuit 230 of FIG. 6 further includes example control logic 615 to control operation of the first multiplexer circuit 605 and second multiplexer circuit 610. In the illustrated example of FIG. 6, the control logic 615 is controlled by one of the DMD controllers 235 and 240, such as the DMD controller labelled A4 in FIG. 6.

Figure 7:
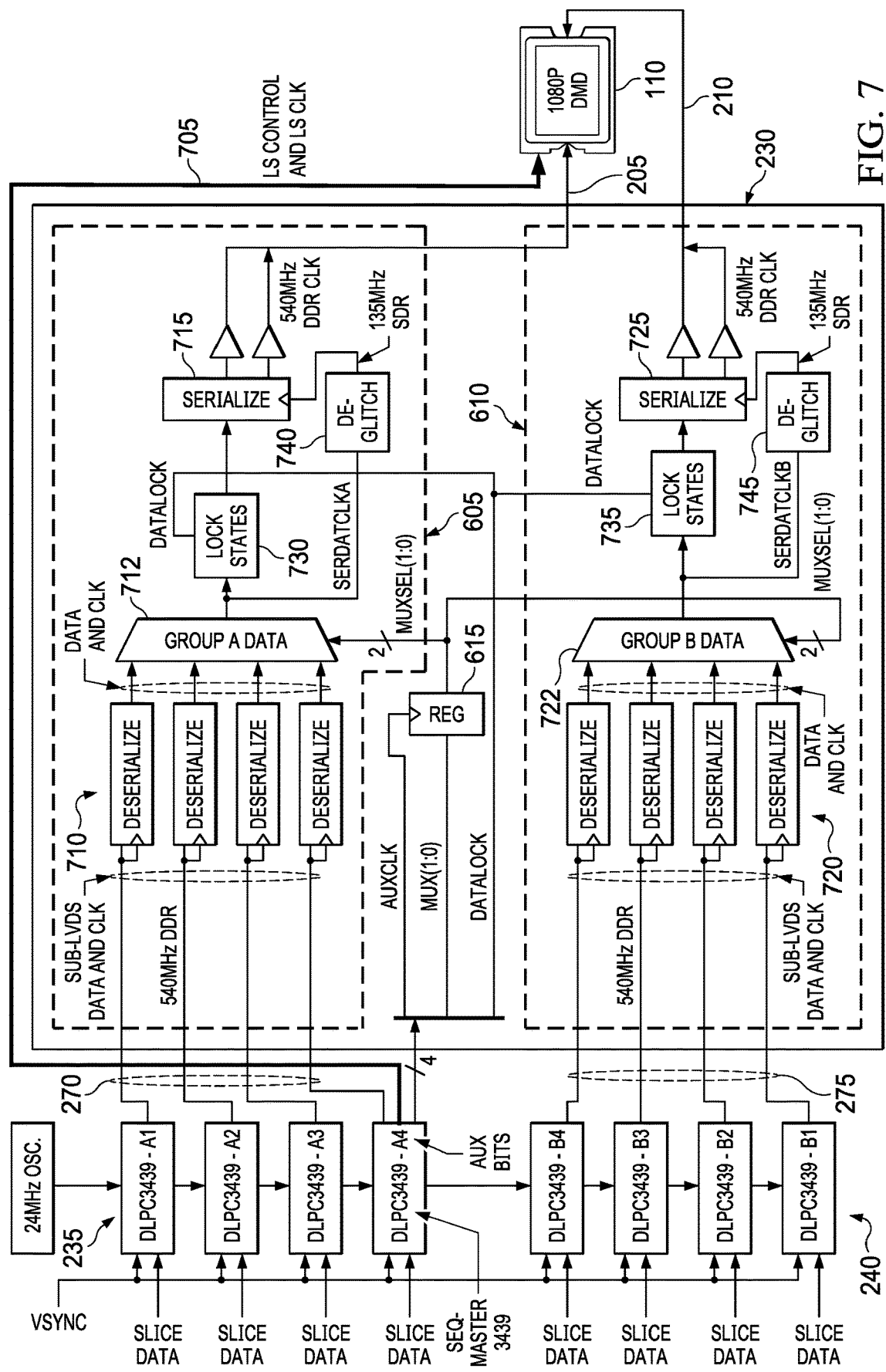
FIG. 7 is a detailed view of the first example implementation of the example stitching circuit of FIG. 6.

FIG. 7 illustrates a detailed view of the example implementation of the stitching circuit 230 of FIG. 6. In the illustrated example of FIG. 7, the stitching circuit 230 is shown in communication with (e.g., electrically coupled to) the first group of DMD controllers 235 (e.g., DLPCs 235), the second group of example DMD controllers 240 (e.g., DLPCs 240) an the DMD 110. Also shown in FIG. 7 are the first group of input interfaces 270 (which accept the first group of output image slices output from the first group of DMD controllers 235), the second group of input interfaces 275 (which accept the second group of output image slices output from the second group of DMD controllers 240), the left frame input interface 205 of the DMD (which accepts the left frame input image data 215 output from the stitching circuit 230) and the right frame input interface 210 of the DMD 110 (which accepts the right frame input image data 220 output from the stitching circuit 230). The example stitching circuit 230 of FIG. 7 also includes the first multiplexer circuit 605, the second multiplexer circuit 610 and the control logic 615.

The example implementation of the stitching circuit 230 illustrated in FIG. 7 is based on the following principles.

1) The DMD controllers 235 and 240 perform the same sequences of operations on their respective input image slices to generate their respective corresponding output image slices. However, a master DMD controller (e.g., the DMD controller labelled A4 in the illustrated example) controls the control logic 615 such that each of the DMD controllers 235 and 240 is permitted to load its respective output image slice to the DMD 110 only when the output image slice is ready for loading.

2) The master DMD controller (e.g., the DMD controller labelled A4 in the illustrated example) sends the appropriate control and clock signals, such as the example signals 705 of FIG. 7, to the DMD 110 to control the flipping of the micromirrors in the DMD 110. Because just the master DMD controller sends these control and clock signals to the DMD 110, no multiplexing of corresponding control and clock signals output from the other DMD controllers is needed, which also avoids the need to manage glitches that could result from multiplexing such signals.

3) The master DMD controller (e.g., the DMD controller labelled A4 in the illustrated example) outputs control signals (e.g., control bits) to the control logic 615 to control the multiplexer circuits 605 and 610.

4) Idle times are enforced during transitions of the multiplexer circuits 605 and 610 to avoid signal glitches that might send false commands to the DMD 110.

With the foregoing in mind, the first example multiplexer circuit 605 of the example stitching circuit 230 of FIG. 7 includes a first group of example deserializers 710 coupled (e.g., electrically coupled) to the first group of input interfaces 270 to accept the output image slice data from the first group of DMD controllers 235. In the illustrated example, each one of the deserializers 710 converts the output image slice data from its respective DMD controller 235 from a first bit width (e.g., 16-bit data) to a second, larger bit width (e.g., 128-bit data) for processing within the stitching circuit 230. Such deserialization of the output image slice data enables a corresponding reduction in the internal clock rate used by the stitching circuit 230 (e.g., from a 540 MHz double data rate (DDR) clock output from the DMD controllers 235 and 240 to a 135 MHz single data rate (SDR) clock internal to the stitching circuit 230). The outputs of the first group of deserializers 710 are coupled (e.g., electrically coupled) to the corresponding inputs of a first example multiplexer 712, with the multiplexer inputs being selected by the control logic 615. The control logic 615 selects each one of the first group of deserializers 710 sequentially such that the output of the selected deserializer 710 is communicatively coupled to the output of the first multiplexer 712. The output of the first multiplexer 712 is coupled (e.g., electrically coupled) to a first example serializer 715, which converts the data provided by the output of the one of the deserializers 710 selected by the multiplexer 712 from the second bit width (e.g., 128-bit data) to the first, smaller bit width (e.g., 16-bit data).

Likewise, the second example multiplexer circuit 610 of the example stitching circuit 230 of FIG. 7 includes a second group of example deserializers 720 coupled (e.g., electrically coupled) to the second group of input interfaces 275 to accept the output image slice data from the second group of DMD controllers 240. In the illustrated example, each one of the deserializers 720 converts the output image slice data from its respective DMD controller 240 from a first bit width (e.g., 16-bit data) to a second, larger bit width (e.g., 128-bit data) for processing within the stitching circuit 230. Such deserialization of the output image slice data enables a corresponding reduction in the internal clock rate used by the stitching circuit 230. The outputs of the second group of deserializers 720 are coupled (e.g., electrically coupled) to the corresponding inputs of a second example multiplexer 722, with the multiplexer inputs being selected by the control logic 615. The control logic 615 selects each one of the second group of deserializers 720 sequentially such that the output of the selected deserializer 720 is communicatively coupled to the output of the second multiplexer 722. The output of the second multiplexer 722 is coupled (e.g., electrically coupled) to a second example serializer 725, which converts the input data provided by the output of the one of the deserializers 720 selected by the multiplexer 722 from the second bit width (e.g., 128-bit data) to the first, smaller bit width (e.g., 16-bit data).

The example stitching circuit 230 of FIG. 7 also includes example lock states logic 730 and 735 to ensure that the data signals output from the first and second multiplexer circuits 605 and 610, respectively, do not glitch at the multiplexer transitions, as glitches could be interpreted as commands by the DMD 110.

The example stitching circuit 230 of FIG. 7 further includes example de-glitch logic 740 and 745 to ensure that the clock signals output from the first and second multiplexer circuits 605 and 610, respectively, do not glitch at the multiplexer transitions. In the illustrated example, the DMD controllers 235 and 240 may each output a respective output data clock signal (e.g., a 540 MHz DDR clock) with their respective output image slice data. The output data clocks may be out-of-phase with each other. Therefore, simple multiplexing of the data clocks output from the DMD controllers 235 and 240 could result in clock glitches. The de-glitch logic 740 and 745 ensure that such clock glitches are not transmitted to the DMD 110.

Figure 8:
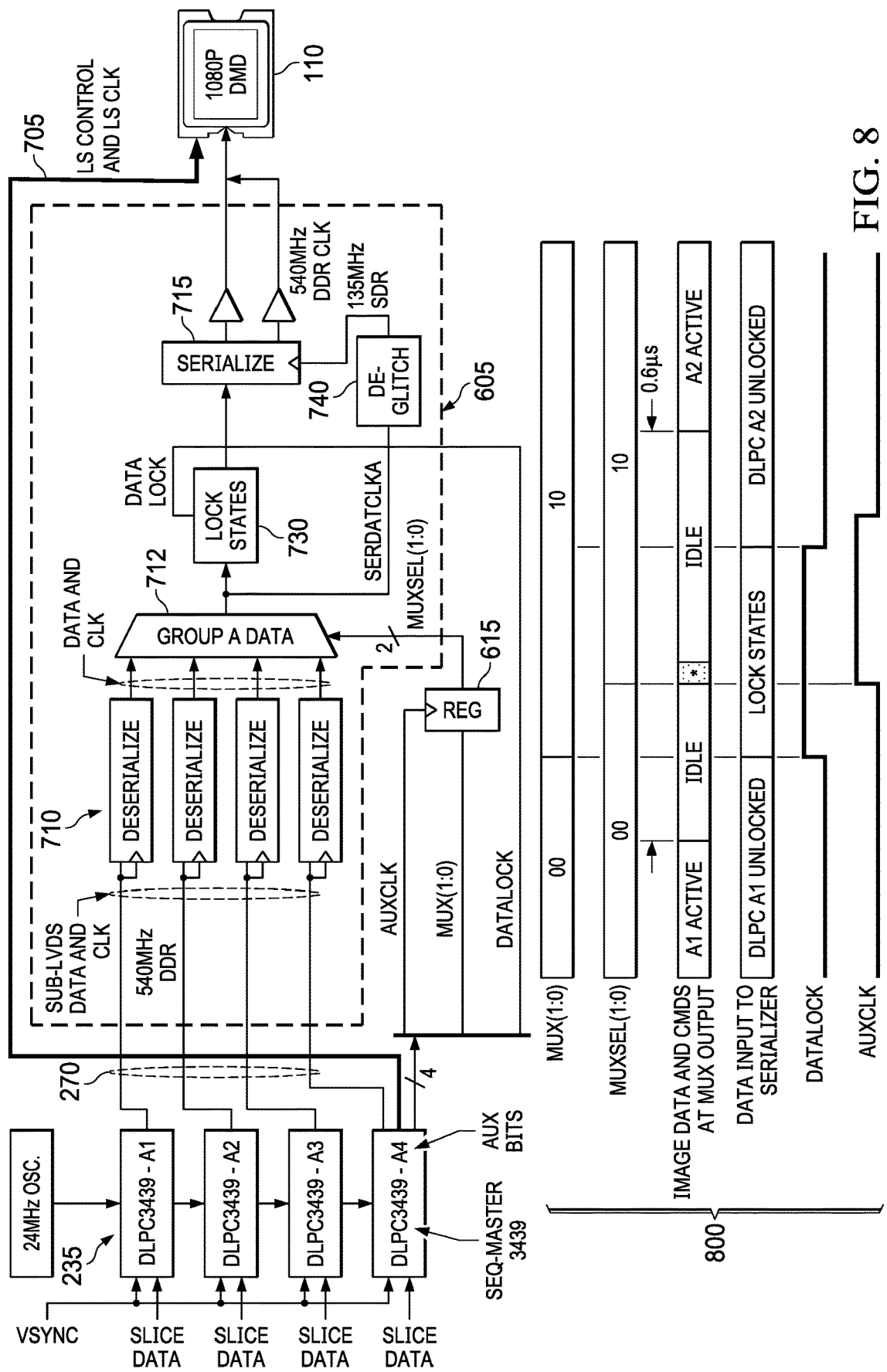
FIG. 8 illustrates example operation of the first example implementation of the example stitching circuit of FIG. 6.

In the illustrated example of FIG. 7, the master DMD controller (e.g., the DMD controller labelled A4 in FIG. 7) uses four auxiliary bits (auxbits) to control the control logic 615. For example, the master DMD controller uses two auxiliary bits to output the MUX(1:0) bits, which select among the inputs of the first and second multiplexer circuits 605 and 610. In the illustrated example, the first and second multiplexer circuits 605 and 610 are operated in parallel by having the control logic 615 tie the MUX(1:0) bits to the MUXSEL(1:0) input select lines of both the first and second multiplexers 712 and 722, as shown. The master DMD controller also uses two other auxbits to output a DATALOCK bit and an AUXCLK bit, as shown. The DATALOCK bit indicates when the data bits being output from the first and second multiplexer circuits 605 and 610 are to be locked. The AUXCLK bit clocks the MUX(1:0) bits to the MUXSEL(1:0) select lines such that the multiplexer select lines are not controlled until the data has been locked by the DATALOCK bit. A diagram 800 illustrating example timing of the MUX(1:0) bits, MUXSEL(1:0) bits, DATALOCK bit and AUXCLK bit is illustrated in FIG. 8.

Figure 9:
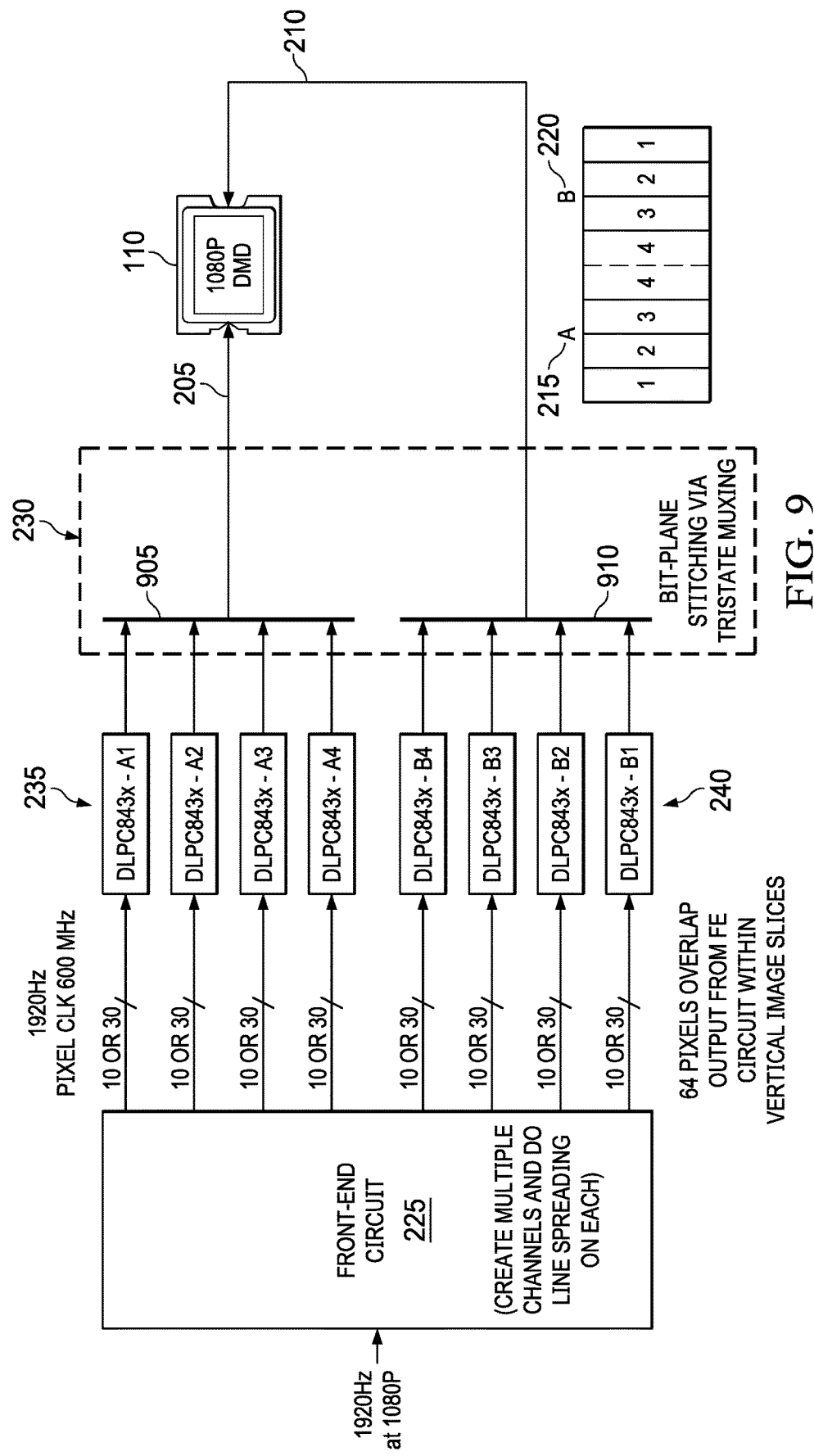
FIG. 9 illustrates a second example implementation of the example stitching circuit included in the example image slicing display controller of FIG. 2.

FIG. 9 illustrates a block diagram of a second example implementation of the stitching circuit 230 of FIG. 2. In the illustrated example of FIG. 9, the first group of DMD controllers 235 (e.g., DLPCs 235) and the second group of DMD controllers 240 (e.g., DLPCs 240) are assumed to have tristate outputs that can be configured to output a logic-1 value, output a logic-0 value, or be set to a high-impedance, which in effect removes the output from a bus or other circuit to which its connected. As such, the example stitching circuit 230 of FIG. 9 is implemented by a first example tristate bus 905 and a second example tristate bus 910. The first tristate bus 905 couples (e.g., electrically couples) the tristate outputs of the first group of DMD controllers 235 to the left frame input interface 205 of the DMD (which accepts the left frame input image data 215 output from the stitching circuit 230). The second tristate bus 910 couples (e.g., electrically couples) the tristate outputs of the second group of DMD controllers 240 to the right frame input interface 210 of the DMD (which accepts the right frame input image data 220 output from the stitching circuit 230). In this example, control logic within the DMD controllers 235 and 240 configure their respective tristate outputs to transmit their output image slice data on the tristate busses 905 and 910 at the appropriate time.

Figure 10:
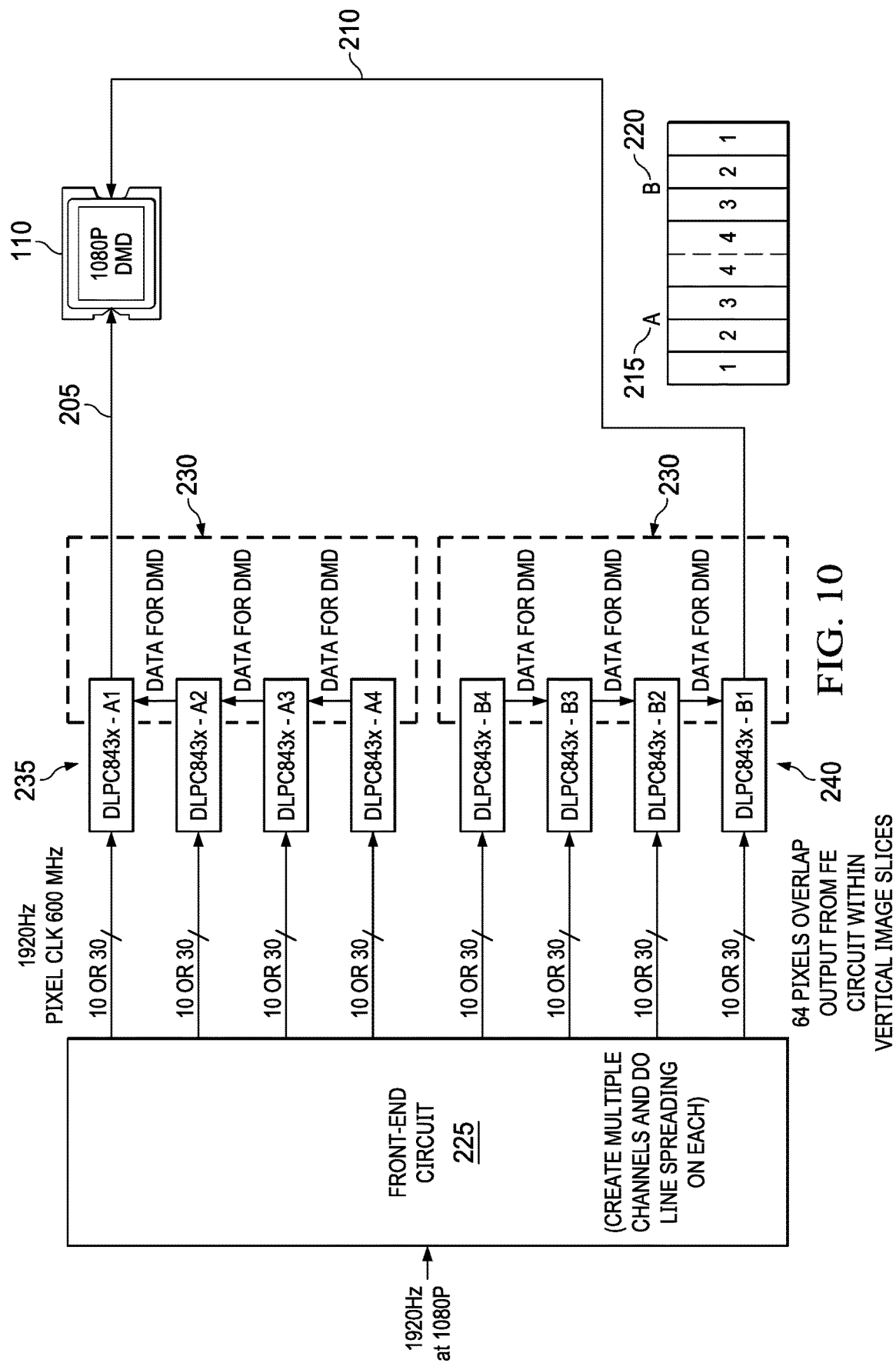
FIG. 10 illustrates a third example implementation of the example stitching circuit included in the example image slicing display controller of FIG. 2.

FIG. 10 illustrates a block diagram of a third example implementation of the stitching circuit 230 of FIG. 2. In the illustrated example of FIG. 9, the stitching circuit 230 is implemented by multiplexers included in respective ones of the DMD controllers 235 and 240 which allow daisy-chaining of the DMD controllers 235 and 240. For example, in FIG. 9, the first group of DMD controllers 235 (e.g., DLPCs 235) are daisy-chained such that the output of the DMD controller labelled A4 is daisy-chained with the output of the DMD controller labelled A3, which is daisy-chained with the output of the DMD controller labelled A2, which is daisy-chained with the output of the DMD controller labelled A1, which is coupled (e.g., electrically coupled) to the left frame input interface 205 of the DMD (which accepts the left frame input image data 215 output from the stitching circuit 230). Likewise, the second group of DMD controllers 240 (e.g., DLPCs 240) are daisy-chained such that the output of the DMD controller labelled B4 is daisy-chained with the output of the DMD controller labelled B3, which is daisy-chained with the output of the DMD controller labelled B2, which is daisy-chained with the output of the DMD controller labelled B1, which is coupled (e.g., electrically coupled) to the right frame input interface 210 of the DMD (which accepts the right frame input image data 220 output from the stitching circuit 230). In this example, control logic within the DMD controllers 235 and 240 configure their respective multiplexer to time multiplex their output image slice data at the appropriate time for output to the left frame input interface 205 and the right frame input interface 210 of the DMD, respectively.

Example implementations of the image slicing display controller 105 described above include elements that are described as being coupled, such as electrically coupled. For example, an input (or input interface) of one element can be electrically coupled to an output (or output interface) of another element in any appropriate manner, such as, but not limited to, using electrical lines, traces, busses, pins, wires, etc. However, in some example implementations of the image slicing display controller 105, elements included in the image slicing display controller 105 may be coupled in other manners, such as optically coupled, wirelessly coupled (e.g., via radio frequency communication links, infrared communication links, etc.), etc.

While an example manner of implementing the example image slicing display controller 105 is illustrated in FIGS. 1-10, one or more of the elements, processes and/or devices illustrated in FIGS. 1-10 may be combined, divided, rearranged, omitted, eliminated and/or implemented in any other way. Further, the example front-end circuit 225, the example stitching circuit 230, the first group of example DMD controllers 235, the second group of example DMD controllers 240, the example line memory 505, the example image slicer 510, the example control signal generator 515, the example first multiplexer circuit 605, the example second multiplexer circuit 610, the example control logic 615, the first group of example deserializers 710, the first example serializer 715, the second group of example deserializers 720, the second example serializer 725, the example lock states logic 730 and/or 735, the example de-glitch logic 740 and/or 745, first example tristate bus 905, the second example tristate bus 910 and/or, more generally, the example image slicing display controller 105 of FIGS. 1-10 may be implemented by hardware, software, firmware and/or any combination of hardware, software and/or firmware. Thus, for example, any of the example front-end circuit 225, the example stitching circuit 230, the first group of example DMD controllers 235, the second group of example DMD controllers 240, the example line memory 505, the example image slicer 510, the example control signal generator 515, the example first multiplexer circuit 605, the example second multiplexer circuit 610, the example control logic 615, the first group of example deserializers 710, the first example serializer 715, the second group of example deserializers 720, the second example serializer 725, the example lock states logic 730 and/or 735, the example de-glitch logic 740 and/or 745, first example tristate bus 905, the second example tristate bus 910 and/or, more generally, the example image slicing display controller 105 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). In a purely software and/or firmware implementation, at least one of the example image slicing display controller 105, the example front-end circuit 225, the example stitching circuit 230, the first group of example DMD controllers 235, the second group of example DMD controllers 240, the example line memory 505, the example image slicer 510, the example control signal generator 515, the example first multiplexer circuit 605, the example second multiplexer circuit 610, the example control logic 615, the first group of example deserializers 710, the first example serializer 715, the second group of example deserializers 720, the second example serializer 725, the example lock states logic 730 and/or 735, the example de-glitch logic 740 and/or 745, first example tristate bus 905 and/or the second example tristate bus 910 is/are hereby expressly defined to include a non-transitory computer readable storage device or storage disk such as a memory, a digital versatile disk (DVD), a compact disk (CD), a Blu-ray disk, etc. including the software and/or firmware. Further still, the example image slicing display controller 105 may include one or more elements, processes and/or devices in addition to, or instead of, those illustrated in FIGS. 1-4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 11:
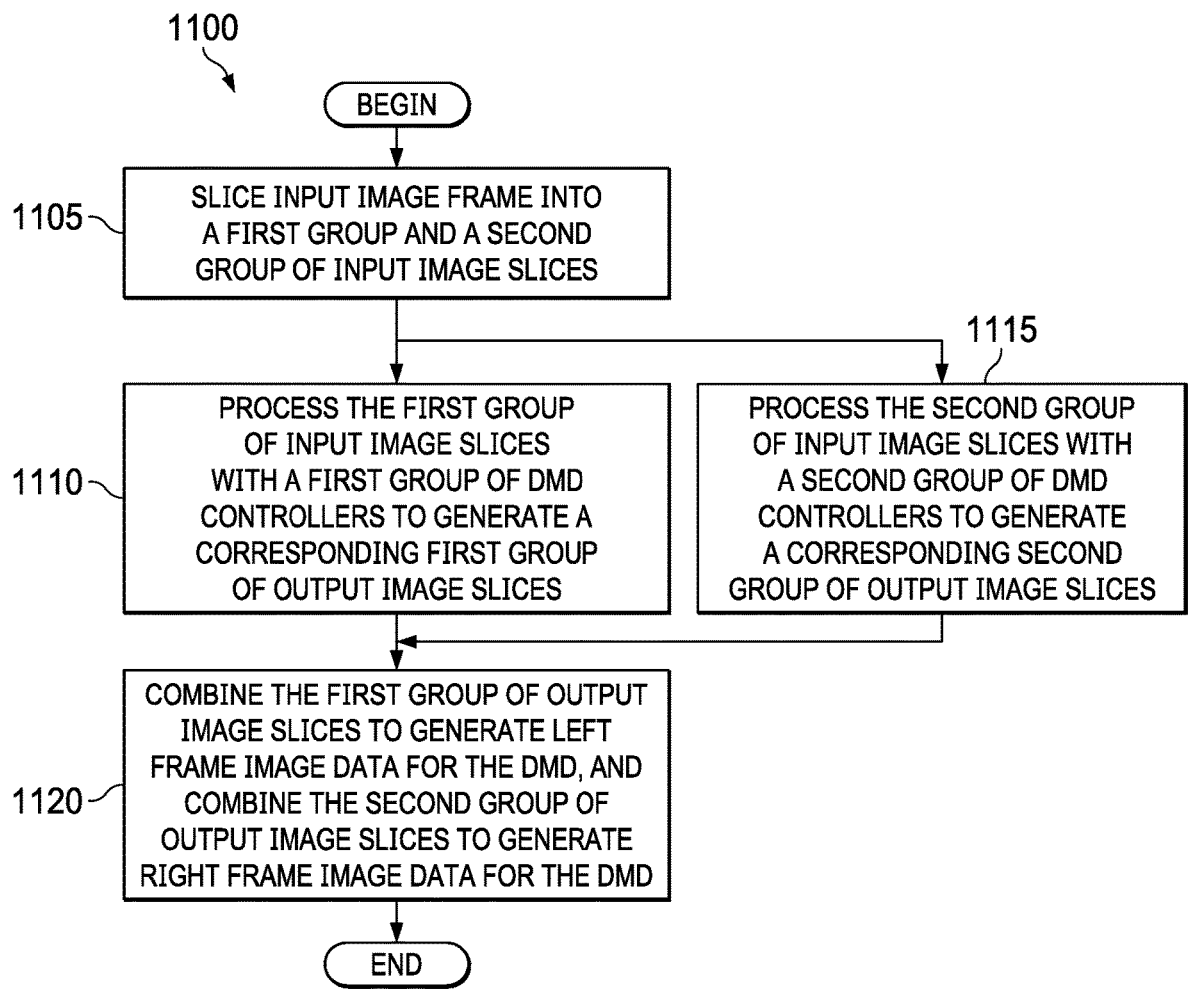
FIGS. 11-13 are flowcharts representative of example logic operations and/or computer readable instructions that may be executed to implement the example image slicing display controller of FIG. 2, the example front-end circuit of FIGS. 2 and/or 3, and/or the example stitching circuit of FIGS. 6, 7 and/or 9.
Figure 12:
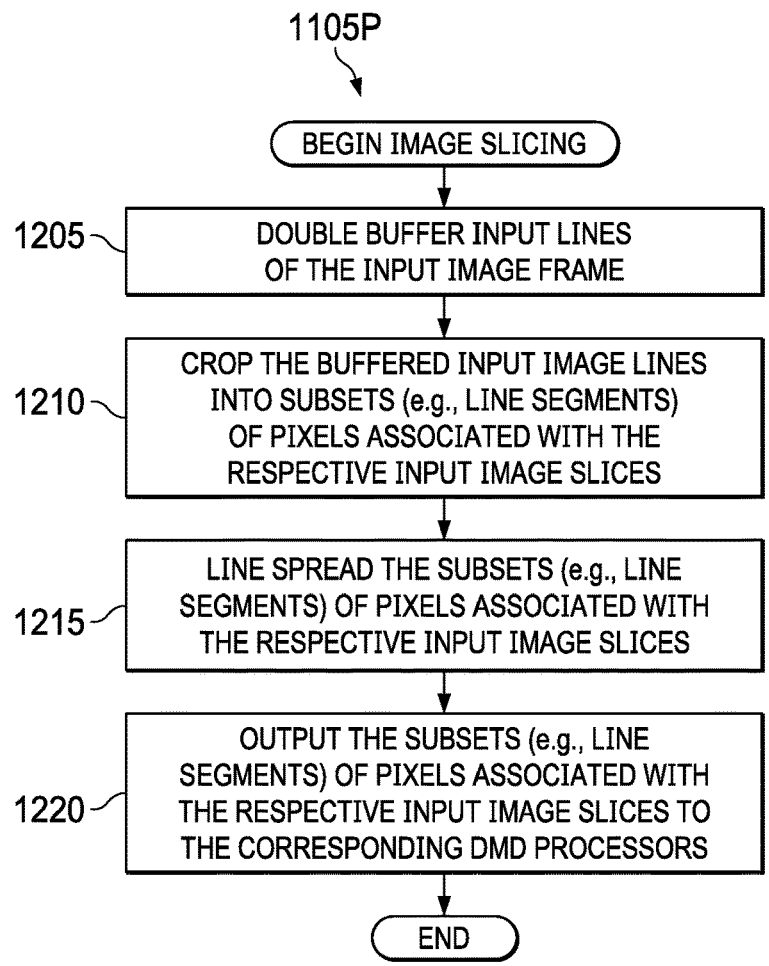
Figure 13:
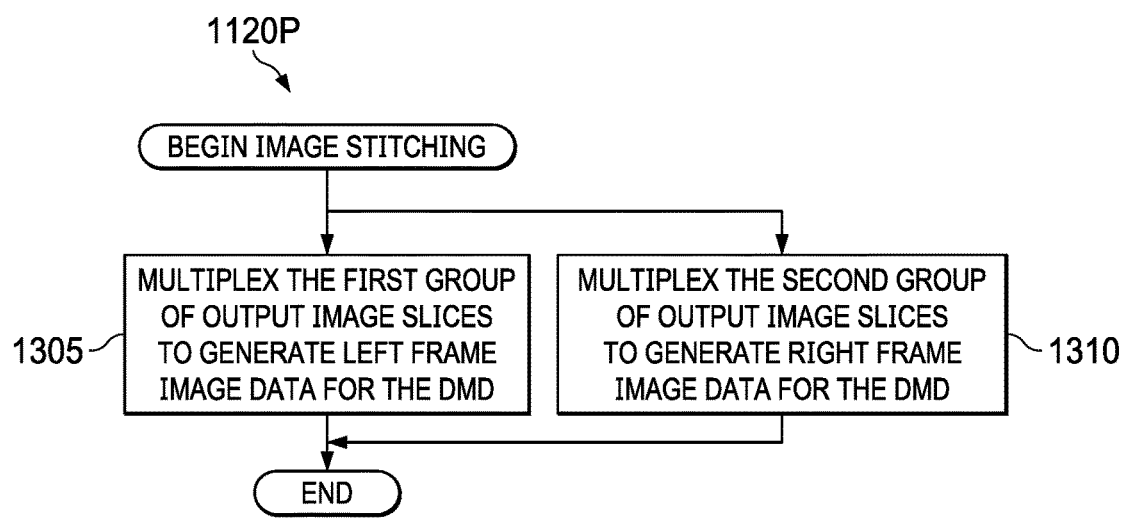

Flowcharts representative of example hardware logic, machine readable instructions, hardware implemented state machines, and/or any combination thereof for implementing the example image slicing display controller 105 are shown in FIGS. 11-13, respectively. In these examples, the machine readable instructions may be one or more executable programs or portion(s) of an executable program for execution by a computer processor, such as the processor 1412 shown in the example processor platform 1400 described below in connection with FIG. 14. The one or more programs, or portion(s) thereof, may be embodied in software stored on a non-transitory computer readable storage medium such as a CD-ROM, a floppy disk, a hard drive, a DVD, a Blu-ray Disk™, or a memory associated with the processor 1412, but the entire program or programs and/or parts thereof could alternatively be executed by a device other than the processor 1412, and/or embodied in firmware or dedicated hardware. Further, although the example program(s) is(are) described with reference to the flowcharts illustrated in FIGS. 11-13, many other methods of implementing the example image slicing display controller 105 may alternatively be used. For example, with reference to the flowcharts illustrated in FIGS. 11-13, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be used to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the described machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As described above, the example processes of FIGS. 11-13 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

In this description, the term "and/or" (when used in a form such as A, B, and/or C refers to any combination or subset of A, B, C, such as: (i) A alone, (ii) B alone, (iii) C alone, (iv) A with B, (v) A with C, (vi) B with C, and (vii) A with B and with C. Also, as used herein in, the phrase "at least one of A or B" (or "at least one of A and B") refers to implementations including any of: (i) at least one A, (ii) at least one B, and (iii) at least one A and at least one B.

An example program 1100 that may be executed to implement the example image slicing display controller 105 of FIGS. 1-10 is represented by the flowchart shown in FIG. 11. With reference to the preceding figures and associated written descriptions, the example program 1100 begins execution at block 1105 at which the front-end circuit 225 of the image slicing display controller 105 slices an input image frame into a first group of input image slices and a second group of input image slices, as described above. At block 1110, the first group of DMD controllers 235 of the image slicing display controller 105 process the first group of input image slices obtained at block 1105 to generate a corresponding first group of output image slices, as described above. At block 1115, and in parallel with the processing at block 1110, the second group of DMD controllers 240 of the image slicing display controller 105 process the second group of input image slices obtained at block 1105 to generate a corresponding second group of output image slices, as described above. At block 1120, the stitching circuit 230 of the image slicing display controller 105 combines the first group of output image slices obtained at block 1110 to generate the left frame image data to input to the DMD 110, as described above. At block 1120, the stitching circuit 230 also combines the second group of output image slices obtained at block 1110 to generate the right frame image data to input to the DMD 110.

An example program 1105P that may be executed to implement the example front-end circuit 225 of FIGS. 2-5, and/or the processing at block 1105 of FIG. 11, is represented by the flowchart shown in FIG. 12. With reference to the preceding figures, the example program 1105P begins execution at block 1205 at which the line memory 505 of the front-end circuit 225 double buffers input lines of the input image frame, as described above. At block 1210, the image slicer 510 of the front-end circuit 225 crops the input lines buffered at block 1205 into subsets (line segments) of pixels associated with the respective input image slices, as described above. At block 1215, the image slicer 510 line spreads the subsets (line segments) of pixels associated with the respective input image slices, as described above. At block 1220, the image slicer 510 outputs the subsets (line segments) of pixels associated with the respective input image slices (which have been line spread), as described above.

An example program 1120P that may be executed to implement the example stitching circuit 230 of FIGS. 2 and 6-8, and/or the processing at block 1120 of FIG. 11, is represented by the flowchart shown in FIG. 13. With reference to the preceding figures, the example program 1120P begins execution at block 1305 at which the first multiplexer circuit 605 of the stitching circuit 230 multiplexes the first group of output image slices (e.g., obtained from the first group of DMD controllers 235) to generate the left frame image data to input to the DMD 110, as described above. At block 1310, and in parallel with the processing at block 1305, the second multiplexer circuit 605 of the stitching circuit 230 multiplexes the second group of output image slices (e.g., obtained from the second group of DMD controllers 240) to generate the right frame image data to input to the DMD 110.

Figure 14:
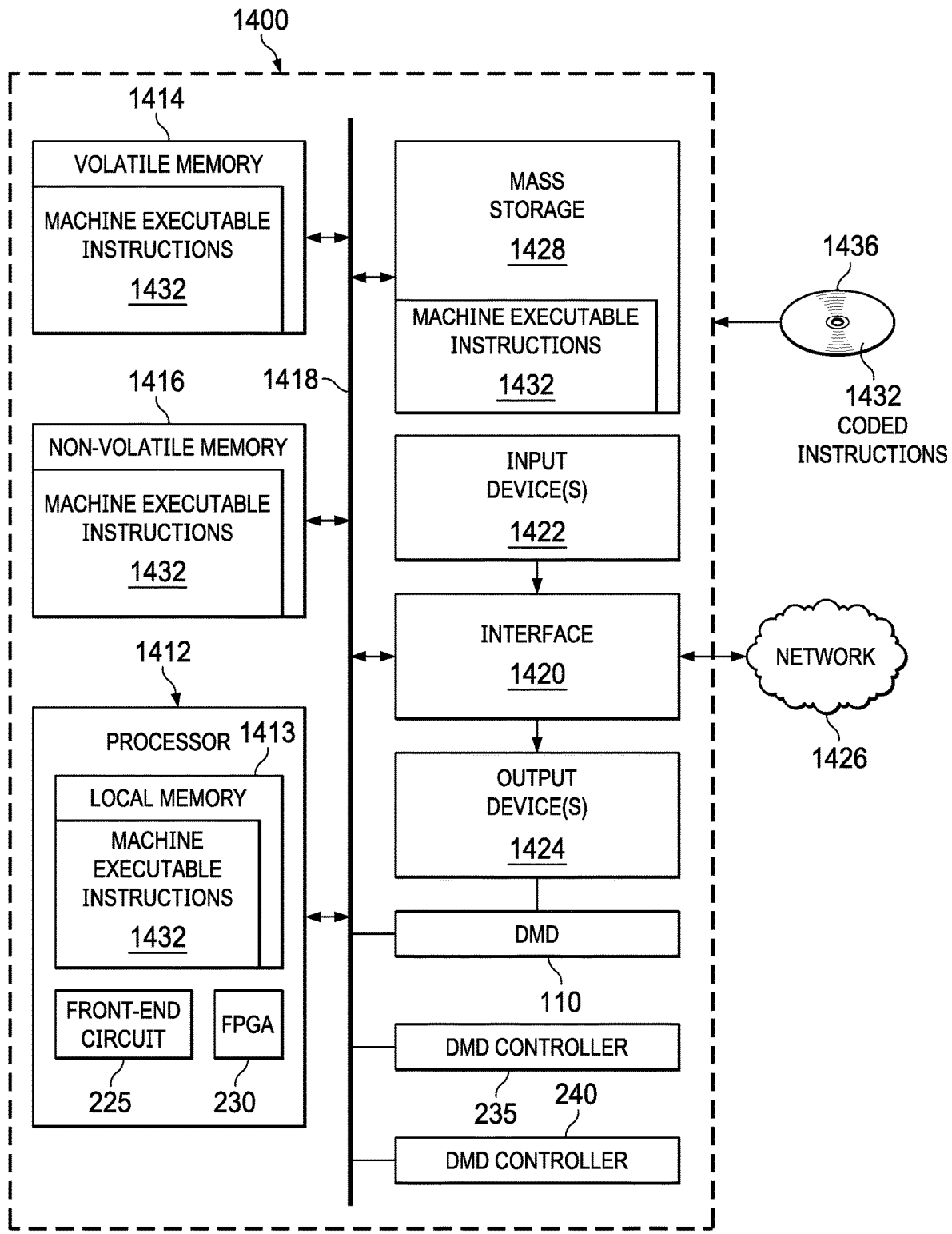
FIG. 14 is a block diagram of an example processor platform structured to implement the example logic operations and/or execute the example computer readable instructions of FIGS. 11-13 to implement the example image slicing display controller of FIG. 2, the example front-end circuit of FIGS. 2 and/or 3, and/or the example stitching circuit of FIGS. 6, 7 and/or 9.

FIG. 14 is a block diagram of an example processor platform 1400 structured to execute the instructions of FIGS. 11-13 to implement the example image slicing display controller 105 of FIGS. 1-10. The processor platform 1400 can be, for example, a server, a personal computer, a workstation, a self-learning machine (e.g., a neural network), a mobile device (e.g., a cell phone, a smart phone, a tablet such as an iPad™), or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor 1412 may be a semiconductor based (e.g., silicon based) device. In this example, the processor 1412 implements the example front-end circuit 225 and the example stitching circuit 230.

The processor 1412 of the illustrated example includes a local memory 1413 (e.g., a cache). The processor 1412 of the illustrated example is in communication with a main memory including a volatile memory 1414 and a non-volatile memory 1416 via a link 1418. The link 1418 may be implemented by a bus, one or more point-to-point connections, etc., or a combination thereof. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface. In the illustrated example, the first group of example DMD controllers 235 and the second group of example DMD controllers 240, as well as the DMD 110, are connected to the interface circuit 1420.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1400, can allow the user to control the computer system and provide data to the computer using physical gestures, such as, but not limited to, hand or body movements, facial expressions, and face recognition.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 1420 of the illustrated example, thus, includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives.

The machine executable instructions 1432 corresponding to the instructions of FIG. 11-13 may be stored in the mass storage device 1428, in the volatile memory 1414, in the non-volatile memory 1416, in the local memory 1413 and/or on a removable non-transitory computer readable storage medium, such as a CD or DVD 1436.

Accordingly, in example methods, apparatus and articles of manufacture described herein, image slicing is implemented to generate input frames for a DMD. The described methods, apparatus and articles of manufacture improve the efficiency of using a computing device, such as a video display system, by increasing the number of DMD controllers (e.g., DLPCs) driving the DMD, thereby increasing the video display system's net image processing bandwidth. Furthermore, each DMD controller (e.g., DLPC) processes a respective vertical slice of a given input image frame, rather than an entire half of the input image frame, thereby resulting in a reduction of the image processing bandwidth used by each DMD controller (e.g., DLPC). The described methods, apparatus and articles of manufacture are accordingly directed to one or more improvement(s) in the functioning of a computer.

Modifications are possible in the described embodiments, and other embodiments are possible, within the scope of the claims.

What is claimed is:

1. An apparatus comprising:
    a first circuit having first outputs and second outputs, the first circuit configured to slice an input image frame to produce first input image slices at the first outputs and second input image slices at the second outputs;
    first controllers having first inputs and third outputs, the first inputs coupled to the first outputs, the first controllers configured to process the first input image slices to produce first output image slices at the third outputs;
    second controllers having second inputs and fourth outputs, the second inputs coupled to the second outputs, the second controllers configured to process the second input image slices to produce second output image slices at the fourth outputs; and
    a second circuit having third inputs, fourth inputs, fifth outputs, and sixth outputs, the third inputs coupled to the third outputs and the fourth inputs coupled to the fourth outputs, the second circuit configured to:
        combine the first output image slices to produce first image frame data at the fifth outputs; and
        combine the second output image slices to produce second image frame data at the sixth outputs.

2. The apparatus of claim 1, wherein the first circuit comprises:
    line memory configured to store a first line of the input image frame; and
    an image slicer configured to:
        output a first subset of pixels of the first line to a first controller of the first controllers, the first subset of pixels corresponding to a first input image slice of the first input image slices; and
        output a second subset of pixels of the first line to a second controller of the first controllers, the second subset of pixels corresponding to a second input image slice of the first input image slices, wherein the second subset of pixels of the first line to are output in parallel with the first subset of pixels of the first line.

3. The apparatus of claim 2, wherein the first circuit is configured to store a second line of the input image frame in the line memory while the first subset of pixels of the first line and the second subset of pixels of the first line are output in parallel.

4. The apparatus of claim 2, wherein the input image frame is associated with a frame rate, and the image slicer is configured to output the first subset of pixels of the first line and the second subset of pixels of the first line in parallel at a pixel clock rate based on the frame rate, a number of pixels in the second subset of pixels, a number of lines included in the input image frame, and a target amount of vertical blanking.

5. The apparatus of claim 2, wherein the first subset of pixels of the first line includes a first number of pixels of the first line, the second subset of pixels of the first line includes a second number of pixels of the first line adjacent to the first number of pixels of the first line, the first subset of pixels of the first line also includes a third number of pixels that overlap with the second subset of pixels of the first line, and the second subset of pixels of the first line also includes a fourth number of pixels that overlap with the first subset of pixels of the first line.

6. The apparatus of claim 5, wherein the first number of pixels corresponds to a total number of pixels included in the first line divided by a total number of image slices included in both the first input image slices and the second input image slices, and the second number of pixels is equal to the first number.

7. The apparatus of claim 1, wherein the second circuit comprises:
a first multiplexer circuit configured to multiplex the first output image slices to produce the first image frame data; and
a second multiplexer circuit configured to multiplex the second output image slices to produce the second image frame data.

8. The apparatus of claim 7, wherein the first multiplexer circuit comprises:
deserializers having seventh outputs, the deserializers configured to receive output image slice data from the first controllers, the deserializers configured to convert the output image slice data from a first bit width to a second bit width, the second bit width larger than the first bit width;
a multiplexer coupled to the deserializers; and
a serializer coupled to the multiplexer, the serializer having a fifth input and a ninth output, the multiplexer configured to select an output of one of the deserializers to communicatively couple with the fifth input, the ninth output configured to communicatively couple with the first inputs, the serializer configured to convert input data with the second bit width to output data with the first bit width.

9. The apparatus of claim 1, wherein the second circuit comprises a first tristate bus and a second tristate bus, the first controllers having tristate outputs, the second controllers having tristate outputs, the first tristate bus is configured to select among the first outputs to combine the first output image slices to produce the first image frame data, and the second tristate bus is configured to select among the second outputs to combine the second output image slices to produce the second image frame data.

10. An apparatus comprising:
a first circuit having a first input, first outputs, and second outputs, the first circuit configured to:
receive an input image frame at the first input;
produce first input image slices of the input image frame at the first outputs; and
produce second input image slices of the input image frame at the second outputs;
first controllers having second inputs and a third outputs, the second inputs coupled to the first outputs, the first controllers configured to process the first input image slices to produce first output image slices at the third outputs;
second controllers of having third inputs and fourth outputs, the third inputs coupled to the second outputs, the second controllers configured to process the second input image slices to produce second output image slices at the fourth outputs; and
a second circuit having fourth inputs, fifth inputs, a fifth output, and a sixth output, the fourth inputs coupled to the third outputs and the fifth inputs coupled to the fourth outputs, the second circuit configured to:
receive, at the fourth inputs, the first output image slices;
receive, at the fifth inputs, the second output image slices;
produce, at the fifth output, image data corresponding to a first output image slice of the first output image slices; and
produce, at the sixth output, image data corresponding to a second output image slice of the second output image slices.

11. The apparatus of claim 10, wherein the first circuit has a clock output, the first circuit configured to provide a pixel clock at the clock output to the first controllers and to the second controllers, the pixel clock having a pixel clock rate based on a frame rate associated with the input image frame, a number of pixels in a line of one of the first input image slices or the second input image slices, a number of lines included in the input image frame, and a target amount of vertical blanking.

12. The apparatus of claim 10, wherein the first circuit comprises line memory configured to double buffer lines of the input image frame during production of the first input image slices and the second input image slices.

13. The apparatus of claim 10, wherein the first circuit comprises a first field programmable gate array, and the second circuit comprises a second field programmable gate array.

14. A method comprising:
slicing, with a first logic circuit, an input image frame into first input image slices and second input image slices;
processing, with first controllers, the first input image slices to produce first output image slices;
processing, with second controllers, the second input image slices to produce second output image slices;
combining, with a second logic circuit, the first output image slices, to produce first image frame data; and
combining, with the second logic circuit, the second output image slices, to produce second image frame data.

15. The method of claim 14, wherein the slicing comprises:
storing a first line of the input image frame in line memory;
outputting a first subset of pixels of the first line to a first controller of the first controllers, the first subset of pixels corresponding to a first input image slice of the first input image slices; and outputting a second subset of pixels of the first line to a second controller of the first controllers, the second subset of pixels corresponding to a second input image slice of the first input image slices, in parallel with outputting the first subset of pixels of the first line.

16. The method of claim 15, further including storing a second line of the input image frame in the line memory while the first subset of pixels of the first line and the second subset of pixels of the first line are output in parallel.

17. The method of claim 15, wherein the input image frame is associated with a frame rate, and the outputting of the first subset of pixels of the first line and the second subset of pixels of the first line in parallel is associated with a pixel clock rate based on the frame rate, a number of pixels in the second subset of pixels, a number of lines included in the input image frame, and a target amount of vertical blanking.

18. The method of claim 15, wherein the first subset of pixels of the first line includes a first number of pixels of the first line, the second subset of pixels of the first line includes a second number of pixels of the first line adjacent to the first number of pixels of the first line, the first subset of pixels of the first line also includes a third number of pixels that overlap with the second subset of pixels of the first line, and the second subset of pixels of the first line also includes a fourth number of pixels that overlap with the first subset of pixels of the first line.

19. The method of claim 18, wherein the first number of pixels corresponds to a total number of pixels included in the first line divided by a total number of image slices included in both the first input image slices and the second input image slices, and the second number of pixels is equal to the first number of pixels.

20. The method of claim 14, wherein:
the combining of the first output image slices comprises multiplexing the first output image slices to produce the first image frame data to provide to first input of a digital micromirror device; and
the combining of the second output image slices comprises multiplexing the second output image slices to produce the second image frame data to provide to a second input of the digital micromirror device.

* * * * *